United States Patent
Kakutani

(10) Patent No.: US 12,445,309 B2
(45) Date of Patent: Oct. 14, 2025

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Naoya Kakutani, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/862,195

(22) Filed: Jul. 11, 2022

(65) Prior Publication Data

US 2022/0345319 A1    Oct. 27, 2022

Related U.S. Application Data

(63) Continuation of application No. 16/449,091, filed on Jun. 21, 2019, now Pat. No. 11,424,937.

(30) Foreign Application Priority Data

Jun. 29, 2018  (JP) ................................. 2018-125178

(51) Int. Cl.
   *H04L 9/32* (2006.01)
   *H04N 1/44* (2006.01)
(52) U.S. Cl.
   CPC .......... *H04L 9/3263* (2013.01); *H04L 9/3247* (2013.01); *H04N 1/4433* (2013.01)
(58) Field of Classification Search
   CPC . H04L 9/3263; H04L 9/3247; H04L 63/0823; H04N 1/4433; G06F 21/33; G06F 21/608; H04W 12/069
   See application file for complete search history.

(56) References Cited

U.S. PATENT DOCUMENTS 6,496,482 B1 * 12/2002 Kubota .................... H04L 67/14
                                                              709/208
7,657,637 B2 *  2/2010 Nakase .................... H04L 67/14
                                                              709/227

(Continued)

FOREIGN PATENT DOCUMENTS

CA       2620702 A1   8/2008
CN   101098234 B      9/2010

(Continued)

OTHER PUBLICATIONS

Kadoya, JP_2020005023—Machine _Translation of Japanese application (Year: 2020).*

(Continued)

*Primary Examiner* — Matthew Smithers
(74) *Attorney, Agent, or Firm* — Canon U.S.A., Inc. IP Division

(57) ABSTRACT

An information processing apparatus capable of connecting to an external apparatus via a network includes a setting unit configured to enable a function of transmitting an issuance request for a digital certificate to the external apparatus at a previously designated date and time or with a previously designated cycle and acquiring a digital certificate from the external apparatus in response to the issuance request, wherein the function is enabled by the setting unit under a condition that information required for connection to the external apparatus is previously input.

25 Claims, 24 Drawing Sheets

(56) References Cited

U.S. PATENT DOCUMENTS

| | | | |
|---|---|---|---|
| 7,937,583 B2* | 5/2011 | Thornton | H04L 63/0823 713/168 |
| 8,185,945 B1 | 5/2012 | Eatough | |
| 8,386,603 B2* | 2/2013 | Arashin | H04L 61/5014 709/224 |
| 8,689,002 B2 | 4/2014 | Yamamoto | |
| 9,130,996 B1 | 9/2015 | Martini | |
| 9,400,891 B2* | 7/2016 | Stephens | H04L 63/101 |
| 9,769,754 B2* | 9/2017 | Sumasu | H04L 27/12 |
| 10,021,627 B2* | 7/2018 | Goto | H04L 63/18 |
| 11,212,273 B1* | 12/2021 | Stoica | H04L 9/0894 |
| 11,252,143 B2* | 2/2022 | Shimazawa | H04L 63/0823 |
| 11,424,937 B2* | 8/2022 | Kakutani | H04L 63/0823 |
| 11,687,168 B2* | 6/2023 | Kobayashi | G06F 3/1253 345/173 |
| 11,838,430 B2* | 12/2023 | Kakutani | H04L 63/126 |
| 2002/0095576 A1 | 7/2002 | Stoltz | |
| 2005/0071630 A1* | 3/2005 | Thornton | H04L 9/3226 713/156 |
| 2005/0210263 A1 | 9/2005 | Levas | |
| 2007/0005981 A1* | 1/2007 | Miyazawa | H04L 9/3268 713/176 |
| 2007/0061426 A1* | 3/2007 | Nakase | H04W 4/00 709/219 |
| 2007/0067620 A1 | 3/2007 | Jevans | |
| 2007/0150738 A1* | 6/2007 | Kawai | H04N 1/444 713/176 |
| 2007/0234055 A1 | 10/2007 | Ohara | |
| 2008/0046720 A1 | 2/2008 | Sugishita | |
| 2008/0195862 A1 | 8/2008 | Bender | |
| 2009/0013177 A1* | 1/2009 | Lee' | G06F 21/10 713/158 |
| 2009/0092106 A1* | 4/2009 | Nakayama | H04N 1/00482 370/338 |
| 2011/0161662 A1 | 6/2011 | Lee | |
| 2011/0179275 A1* | 7/2011 | Thayer | H04L 51/00 713/169 |
| 2012/0023327 A1* | 1/2012 | Nagasaki | H04L 63/0823 713/156 |
| 2012/0023560 A1* | 1/2012 | Yanagi | G06F 21/645 726/6 |
| 2013/0061041 A1 | 3/2013 | Inoue | |
| 2014/0003601 A1 | 1/2014 | Sato | |
| 2014/0321446 A1* | 10/2014 | Son | H04L 12/6418 370/338 |
| 2016/0050200 A1 | 2/2016 | Yu | |
| 2016/0204947 A1 | 7/2016 | Uchikawa | |
| 2017/0104748 A1* | 4/2017 | Koster | H04L 9/3268 |
| 2018/0159842 A1* | 6/2018 | Lurey | H04W 12/068 |
| 2018/0205721 A1* | 7/2018 | Hirahara | H04L 9/3242 |
| 2019/0394051 A1* | 12/2019 | Kakutani | H04N 1/0097 |
| 2020/0007347 A1* | 1/2020 | Kakutani | H04L 63/0823 |
| 2020/0137044 A1* | 4/2020 | Shimazawa | H04L 63/0823 |

FOREIGN PATENT DOCUMENTS

| | | | |
|---|---|---|---|
| CN | 109040008 A | | 12/2018 |
| EP | 2990986 A1 | | 3/2016 |
| EP | 2704353 B1 | | 9/2017 |
| JP | 2006059141 | * | 8/2004 ............ G06F 21/22 |
| JP | 2006239930 A | | 9/2006 |
| JP | 2007-66065 A | | 3/2007 |
| JP | 2007166049 A | | 6/2007 |
| JP | 2007-193717 A | | 8/2007 |
| JP | 2007-194730 A | | 8/2007 |
| JP | 4128610 B | | 7/2008 |
| JP | 2010108396 A | | 5/2010 |
| JP | 2010146302 A | | 7/2010 |
| JP | 2016051437 A | | 4/2016 |
| JP | 2016-178458 A | | 10/2016 |
| JP | 2017-19162 A | | 1/2017 |
| JP | 2020005023 | * | 6/2018 .......... H04N 1/0097 |
| JP | 2020005195 A | | 1/2020 |
| KR | 20180095455 A | | 8/2018 |
| TW | I730549 A | | 6/2021 |
| WO | 01/73569 A1 | | 10/2001 |
| WO | 2013126570 A1 | | 8/2013 |

OTHER PUBLICATIONS

Uchida, JP_202000502—Machine_Translation of Japanese application (Year: 2006).*

* cited by examiner

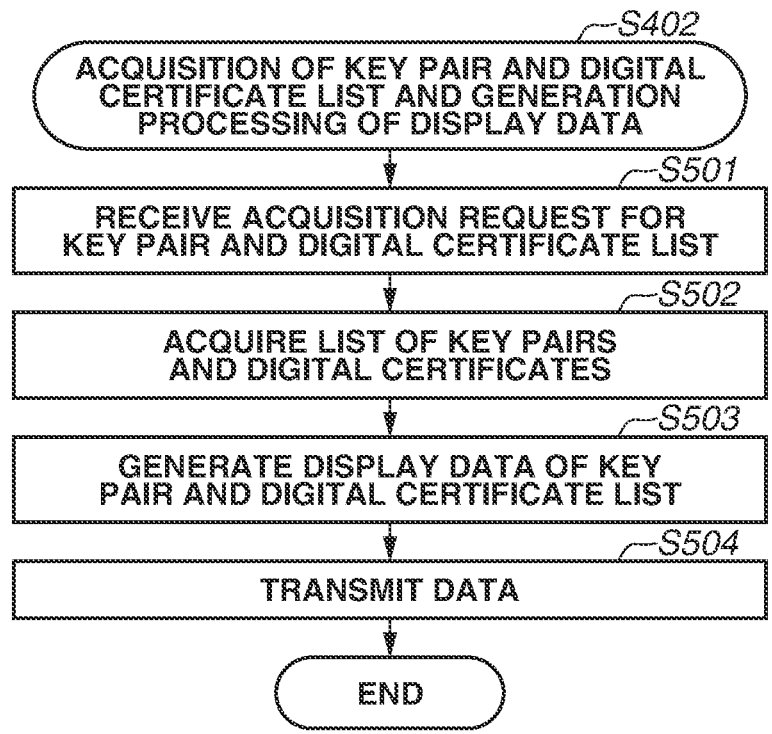
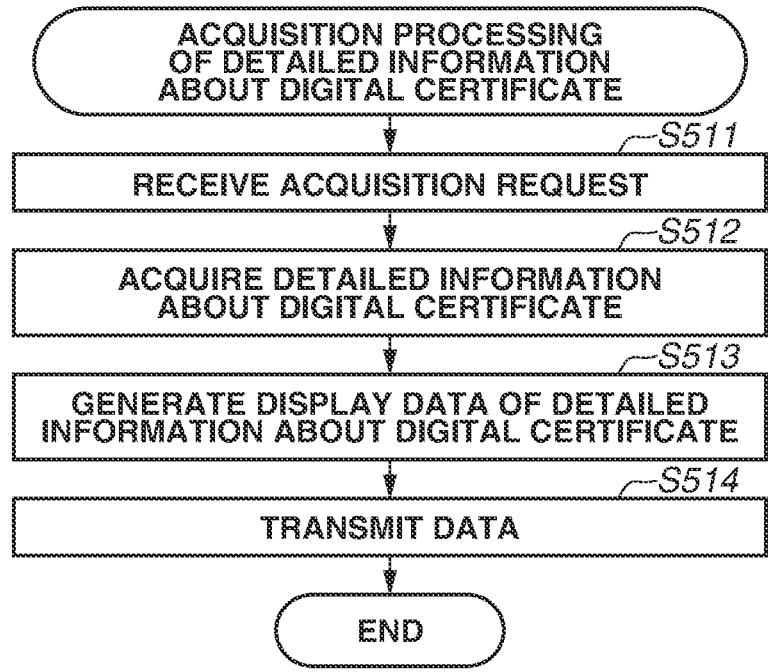

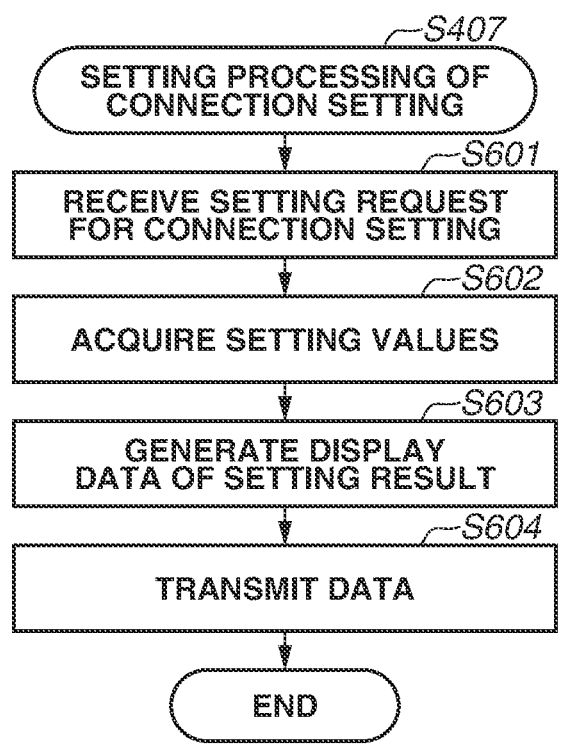

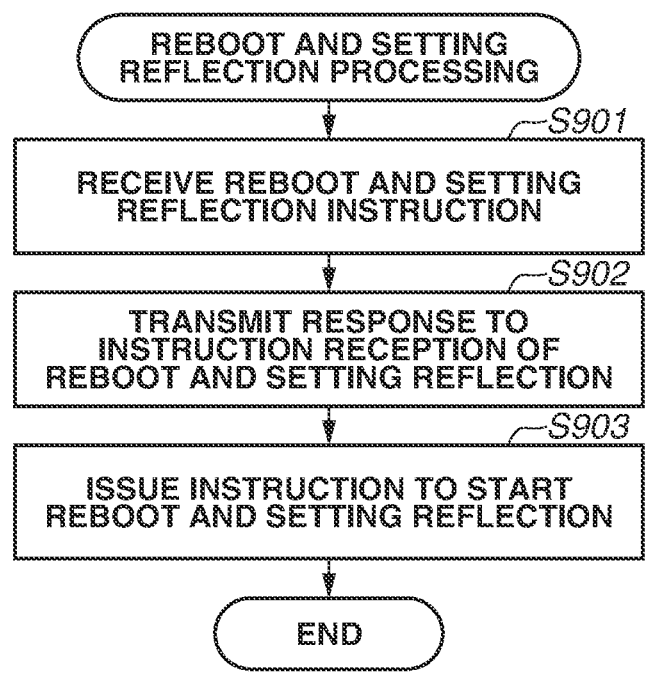

FIG.10A

CERTIFICATE ACQUISITION REQUEST AND SETTING SCREEN

*1002*
CERTIFICATE LIST
CONNECTION SETTING
CA CERTIFICATE ACQUISITION — *1003*
CERTIFICATE ISSUANCE REQUEST
*1004*

CERTIFICATE LIST

| NAME *1011* | USE APPLICATION *1012* | ISSUER *1013* | VALIDITY PERIOD END DATE *1014* | DETAILS *1015* |
|---|---|---|---|---|
| Xyz1 | TLS | CA001 | 2020/1/1 | ⚙ |
| Xyz2 | IPsec | CA001 | 2036/1/1 | ⚙ |
| Xyz3 | IEEE 802.1X | CA001 | 2025/1/1 | ⚙ |

FIG.10B

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

CONNECTION SETTING

SERVER NAME: http://xyz1.abc.co.jp/xxxxxxx/yyyyy  *1016*

PORT NUMBER: 80  *1017*

[ SETTING ]  *1018*

FIG.11A

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

CONNECTION SETTING

SERVER NAME: http://xyz1.abc.co.jp/xxxxxxx/yyyyy
PORT NUMBER: 80

[SETTING]

Setting has been reflected. ~1101

FIG.11B

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

CA CERTIFICATE ACQUISITION

CA CERTIFICATE ACQUISITION  [EXECUTION]~1102

FIG.12A

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

CA CERTIFICATE ACQUISITION

CA CERTIFICATE ACQUISITION  [ EXECUTION ]

The following CA certificate has been acquired and ~1201
registered as a trusted certificate authority.

THUMBPRINT (SHA1) OF CERTIFICATE:
0F 02 0F 03 0F 04 0F 05 0F 06 0F 07 0F 08 0F 09 0F 0A 0F 0B

FIG.12B

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

CA CERTIFICATE ACQUISITION

CA CERTIFICATE ACQUISITION  [ EXECUTION ]

Acquisition of a CA certificate is failed. ~1202

FIG.13A

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

TRANSMISSION OF CERTIFICATE ISSUANCE REQUEST

NAME: Xyz4 ~1301

LENGTH OF KEY ○ 1024 bits ⦿ 2048 bits ○ 3072 bits ○ 4096 bits ~1302

INPUTS OF ISSUANCE DESTINATION INFORMATION ~1303

COUNTRY NAME: JP
PREFECTURE:
CITY, TOWN, OR VILLAGE:
ORGANIZATION: ABC
ORGANIZATION UNIT: DEV01
COMMON NAME: Device001

SIGNATURE VERIFICATION ⦿ PERFORM ○ NOT PERFORM ~1304
USE APPLICATION OF KEY ☑ TLS ☐ IPsec ☐ IEEE 802.1X ~1305
PASSWORD: ABCDEFG12345 ~1306

[ EXECUTION ] ~1307

FIG.13B

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST

TRANSMISSION OF CERTIFICATE ISSUANCE REQUEST

Issuance and acquisition of a certificate are successful. ~1308
Please confirm the issued certificate by referring to the certificate list.
Please perform reboot to reflect the setting.

[ REBOOT ] ~1309

FIG.14A

| CERTIFICATE ACQUISITION REQUEST AND SETTING SCREEN | |
|---|---|
| CERTIFICATE LIST<br>CONNECTION SETTING<br>CA CERTIFICATE ACQUISITION<br>CERTIFICATE ISSUANCE REQUEST | TRANSMISSION OF CERTIFICATE ISSUANCE REQUEST<br><br>Issuance and acquisition of a certificate are failed. ~1401 |

FIG.14B

| CERTIFICATE ACQUISITION REQUEST AND SETTING SCREEN | |
|---|---|
| CERTIFICATE LIST<br>CONNECTION SETTING<br>CA CERTIFICATE ACQUISITION<br>CERTIFICATE ISSUANCE REQUEST | 1402<br>Reboot will be performed to reflect the setting. |

FIG.15

| CERTIFICATE ACQUISITION REQUEST AND SETTING SCREEN | | | | | |
|---|---|---|---|---|---|
| | CERTIFICATE LIST | | | | |
| CERTIFICATE LIST | NAME | USE APPLICATION | ISSUER | VALIDITY PERIOD END DATE | DETAILS |
| CONNECTION SETTING | Xyz1 | — | CA001 | 2020/1/1 | ⚙ |
| CA CERTIFICATE ACQUISITION | Xyz2 | IPsec | CA001 | 2036/1/1 | ⚙ |
| CERTIFICATE ISSUANCE REQUEST | Xyz3 | IEEE 802.1X | CA001 | 2025/1/1 | ⚙ |
| | Xyz4 | TLS | CA001 | 2021/1/1 | ⚙ |

| CERTIFICATE ACQUISITION REQUEST AND SETTING SCREEN | |
|---|---|
| CERTIFICATE LIST<br>CONNECTION SETTING<br>CA CERTIFICATE ACQUISITION<br>CERTIFICATE ISSUANCE REQUEST | DETAILS OF CERTIFICATE INFORMATION<br><br>NAME: Xyz1<br><br>USE APPLICATION: TLS<br><br>ISSUER: CN=CA01, C=JP<br><br>VALIDITY PERIOD START: 2017/1/1<br>VALIDITY PERIOD END: 2020/1/1<br><br>ISSUANCE DESTINATION: CN=Device001, OU=Dev.A, O=ABC, C=JP<br><br>ALGORITHM OF KEY: RSA 2048 bits<br><br>SERIAL NUMBER: 01 02 03 04 05<br><br>THUMBPRINT (SHA1) OF CERTIFICATE:<br>01 02 01 03 01 04 01 05 01 06 01 07 01 08 01 09 01 0A 01 0B |

FIG. 17A

| NAME | USE APPLICATION | ISSUER | VALIDITY PERIOD START DATE | VALIDITY PERIOD END DATE | ISSUANCE DESTINATION | ALGORITHM | KEY LENGTH | SERIAL NUMBER | THUMBPRINT |
|---|---|---|---|---|---|---|---|---|---|
| Xyz1 | TLS | CN=CA01, C=JP | 2019/1/1 | 2020/1/1 | CN=Device001, OU=Dev.A, O=ABC, C=JP | RSA | 1024 | 01 02 03 04 05 | 01 02 01 03 01 04 01 05 01 06 01 07 01 08 01 09 01 0A 01 0B |
| Xyz2 | IPsec | CN=CA01, C=JP | 2015/1/1 | 2036/1/1 | CN=Device001, OU=Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE 802.1X | CN=CA01, C=JP | 2020/1/1 | 2025/1/1 | CN=Device001, OU=Dev.A, O=ABC, C=JP | RSA | 2048 | 01 02 03 04 07 | 03 02 03 03 03 04 03 05 03 06 03 07 03 08 03 09 03 0A 03 0B |

FIG. 17B

| NAME | USE APPLICATION | ISSUER | VALIDITY PERIOD START DATE | VALIDITY PERIOD END DATE | ISSUANCE DESTINATION | ALGORITHM | KEY LENGTH | SERIAL NUMBER | THUMBPRINT |
|---|---|---|---|---|---|---|---|---|---|
| Xyz1 | TLS | CN=CA01, C=JP | 2019/1/1 | 2020/1/1 | CN=Device001, OU=Dev.A, O=ABC, C=JP | RSA | 1024 | 01 02 03 04 05 | 01 02 01 03 01 04 01 05 01 06 01 07 01 08 01 09 01 0A 01 0B |
| Xyz2 | IPsec | CN=CA01, C=JP | 2015/1/1 | 2036/1/1 | CN=Device001, OU=Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE 802.1X | CN=CA01, C=JP | 2020/1/1 | 2025/1/1 | CN=Device001, OU=Dev.A, O=ABC, C=JP | RSA | 2048 | 01 02 03 04 07 | 03 02 03 03 03 04 03 05 03 06 03 07 03 08 03 09 03 0A 03 0B |
| Xyz4 | NONE | CN=CA01, C=JP | 2020/1/1 | 2025/1/1 | CN=Device001, OU=Dev.A, O=ABC, C=JP | RSA | 2048 | 01 02 03 04 08 | 04 02 04 03 04 04 04 05 04 06 04 07 04 08 04 09 04 0A 04 0B |

FIG. 17C

| NAME | USE APPLICATION | ISSUER | VALIDITY PERIOD START DATE | VALIDITY PERIOD END DATE | ISSUANCE DESTINATION | ALGORITHM | KEY LENGTH | SERIAL NUMBER | THUMBPRINT |
|---|---|---|---|---|---|---|---|---|---|
| Xyz1 | NONE | CN=CA01, C=JP | 2019/1/1 | 2020/1/1 | CN=Device001, OU=Dev.A, O=ABC, C=JP | RSA | 1024 | 01 02 03 04 05 | 01 02 01 03 01 04 01 05 01 06 01 07 01 08 01 09 01 0A 01 0B |
| Xyz2 | IPsec | CN=CA01, C=JP | 2015/1/1 | 2035/1/1 | CN=Device001, OU=Dev.A, O=ABC, C=JP | RSA | 2048 | 01 02 03 04 06 | 02 02 02 03 02 04 02 05 02 06 02 07 02 08 02 09 02 0A 02 0B |
| Xyz3 | IEEE 802.1X | CN=CA01, C=JP | 2020/1/1 | 2025/1/1 | CN=Device001, OU=Dev.A, O=ABC, C=JP | RSA | 2048 | 01 02 03 04 07 | 03 02 03 03 03 04 03 05 03 06 03 07 03 08 03 09 03 0A 03 0B |
| Xyz4 | TLS | CN=CA01, C=JP | 2020/1/1 | 2025/1/1 | CN=Device001, OU=Dev.A, O=ABC, C=JP | RSA | 2048 | 01 02 03 04 08 | 04 02 04 03 04 04 04 05 04 06 04 07 04 08 04 09 04 0A 04 0B |

FIG.18

CERTIFICATE ACQUISITION REQUEST AND SETTING SCREEN

- CERTIFICATE LIST
- CONNECTION SETTING
- CA CERTIFICATE ACQUISITION
- CERTIFICATE ISSUANCE REQUEST
- RESERVATION SETTING

CERTIFICATE RENEWAL RESERVATION SETTING

1801
○ Designate a renewal date.
  ACQUISITION REQUEST START DATE: YEAR ☐ MONTH ☐ DAY ☐
  ACQUISITION REQUEST START TIME: HOUR ☐ MINUTE ☐

1802
◉ Perform renewal if the remaining validity period is a predetermined period or less.
  [14] DAYS BEFORE FROM THE EXPIATION DATE 1803
○ Perform renewal with a designated cycle.
  ○ RENEWAL AT INTERVALS OF ☐ DAYS
  ○ RENEWAL ON DAY ☐ OF EACH MONTH
  ○ RENEWAL ON MONTH ☐ DAY ☐ OF EACH YEAR

1804
CERTIFICATE AUTOMATIC DELETION SETTING

AUTOMATIC DELETION AFTER RENEWAL: ◉ PERFORM (18041)  ○ NOT PERFORM (18042)

1805  ☑ Delete only when there is no vacant storage area for digital certificate. (18043)

AUTOMATIC DELETION DETAILED SETTING
  ☑ Delete preceding certificate with same use application setting. (18051)
  ☐ Delete certificate with no use application setting. (18052)
  ☐ Delete only in case of self-signed certificate. (18053)
  ☐ Delete factory default certificate. (18054)
  ☐ Delete certificate with expiration date thereof passed. (18055)

FIG.21

CERTIFICATE ACQUISITION REQUEST AND SETTING SCREEN

CERTIFICATE LIST
CONNECTION SETTING
CA CERTIFICATE ACQUISITION
CERTIFICATE ISSUANCE REQUEST
RESERVATION SETTING

The current setting is not able to be changed because connection setting is still not performed.

CERTIFICATE RENEWAL RESERVATION SETTING

*1801*
○ Designate a renewal date.
ACQUISITION REQUEST START DATE: YEAR [ ] MONTH [ ] DAY [ ]
ACQUISITION REQUEST START TIME: HOUR [ ] MINUTE [ ]

*1802*
○ Perform renewal if the remaining validity period is a predetermined period or less.
[ 14 ] DAYS BEFORE FROM THE EXPIRATION DATE

*1803*
○ Perform renewal with a designated cycle.
  ○ RENEWAL AT INTERVALS OF [ ] DAYS
  ○ RENEWAL ON DAY [ ] OF EACH MONTH
  ○ RENEWAL ON MONTH [ ] DAY [ ] OF EACH YEAR

*1804*
CERTIFICATE AUTOMATIC DELETION SETTING

AUTOMATIC DELETION AFTER RENEWAL: ○ PERFORM (*18041*) ○ NOT PERFORM (*18042*)

*1805* ☐ Delete only when there is no vacant storage area for digital certificate. *18043*

AUTOMATIC DELETION DETAILED SETTING
  ☐ Delete preceding certificate with same use application setting. *18051*
  ☐ Delete certificate with no use application setting. *18052*
  ☐ Delete only in case of self-signed certificate. *18053*
  ☐ Delete factory default certificate. *18054*
  ☐ Delete certificate with expiration date thereof passed. *18055*

INFORMATION PROCESSING APPARATUS, CONTROL METHOD FOR INFORMATION PROCESSING APPARATUS, AND STORAGE MEDIUM

CROSS-REFERENCE TO RELATED APPLICATION

This application is a Continuation of U.S. application Ser. No. 16/449,091, filed Jun. 21, 2019, which claims priority from Japanese Patent Application No. 2018-125178 filed Jun. 29, 2018, which are hereby incorporated by reference herein in their entireties.

BACKGROUND OF THE INVENTION

Field of the Invention

Aspects of the present invention generally relate to an information processing apparatus, a control method for an information processing apparatus, and a storage medium.

Description of the Related Art

Heretofore, the technology of a public key infrastructure (PKI) using digital certificates has been implementing the identification and authentication of secure networks.

For example, an information processing apparatus serving as a client is able to verify the validity of a server by acquiring a server public key certificate acquired from the server and a certificate-authority certificate of a certificate authority which issued the server public key certificate. Moreover, providing a client public key certificate of the information processing apparatus to a server also enables the server to verify the validity of the client.

Digital certificates have respective expiration dates, and, if the expiration date of a digital certificate is passed, communications using the digital certificate would become impossible. Therefore, in a case where the expiration date has been passed or immediately before the expiration date is passed, it is necessary to renew the digital certificate.

Heretofore, there has been known a technique of automatically renewing a digital certificate at predetermined timing immediately before the expiration date thereof is passed, as discussed in Japanese Patent Application Laid-Open No. 2016-178458. When predetermined timing as previously set is reached, the information processing apparatus transmits a renewal request to a certificate management server via a network, and then receives a digital certificate from the certificate management server. However, if, to enable an automatic renewal function for certificates to be used in the information processing apparatus, settings required for the automatic renewal function for certificates are not set in advance, the automatic renewal function for certificates may not be executed in a normal manner. For example, when the automatic renewal function for certificates is enabled while the address of the certificate management server is still not set, the information processing apparatus is unable to connect to the certificate management server and is, therefore, not able to acquire the certificate.

SUMMARY OF THE INVENTION

According to an aspect of the present invention, an information processing apparatus capable of connecting to an external apparatus via a network includes a setting unit configured to enable a function of transmitting an issuance request for a digital certificate to the external apparatus at a previously designated date and time or with a previously designated cycle and acquiring a digital certificate from the external apparatus in response to the issuance request, wherein the function is enabled by the setting unit under a condition that information required for connection to the external apparatus is previously input.

Moreover, according to another aspect of the present invention, an information processing apparatus capable of connecting to an external apparatus via a network includes a reception unit configured to receive, from the external apparatus, a setting value which is to be used in the information processing apparatus, a determination unit configured to determine whether information required for connection to the external apparatus is included in the setting value, and an import unit configured to import the setting value based on the determination unit determining that the information required for connection to the external apparatus is included in the setting value.

Further features of the present invention will become apparent from the following description of exemplary embodiments with reference to the attached drawings.

BRIEF DESCRIPTION OF THE DRAWINGS

FIG. 5A is a flowchart illustrating processing for acquiring a list of key pairs and digital certificates and generating display data, which is performed in step S402 illustrated in FIG. 4 by the multifunction peripheral according to the first exemplary embodiment, and FIG. 5B is a flowchart illustrating processing which is performed when the multifunction peripheral according to the first exemplary embodiment has received a request for displaying detailed information from a personal computer (PC).

FIG. 6 is a flowchart illustrating setting processing of connection setting for a certificate authority and registration authority, which is performed in step S407 illustrated in FIG. 4 by the multifunction peripheral according to the first exemplary embodiment.

FIG. 9 is a flowchart illustrating processing concerning reboot of the multifunction peripheral, which is performed in steps S424 to S427 illustrated in FIG. 4 by the multifunction peripheral according to the first exemplary embodiment.

FIGS. 10A and 10B are diagrams illustrating examples of web page screens of a remote user interface (RUI), which are displayed by the PC according to the first exemplary embodiment.

FIGS. 11A and 11B are diagrams illustrating examples of web page screens of the RUI, which are displayed by the PC according to the first exemplary embodiment.

FIGS. 12A and 12B are diagrams illustrating examples of web page screens of the RUI, which are displayed by the PC according to the first exemplary embodiment.

FIGS. 13A and 13B are diagrams illustrating examples of web page screens of the RUI, which are displayed by the PC according to the first exemplary embodiment.

FIGS. 14A and 14B are diagrams illustrating examples of web page screens of the RUI, which are displayed by the PC according to the first exemplary embodiment.

FIG. 15 is a diagram illustrating an example of a web page screen of the RUI, which is displayed by the PC according to the first exemplary embodiment.

FIG. 16 is a diagram illustrating an example of detailed information about a digital certificate, which is displayed by the PC according to the first exemplary embodiment.

FIGS. 17A, 17B, and 17C are conceptual diagrams illustrating examples of a database of detailed information about key pairs and digital certificates, which a key pair and certificate management unit of the multifunction peripheral according to the first exemplary embodiment manages.

FIG. 18 is a diagram illustrating an example of a renewal reservation setting screen for a digital certificate, which the multifunction peripheral according to the first exemplary embodiment has.

FIG. 21 is a diagram illustrating an example of a renewal reservation setting screen for a digital certificate, which the multifunction peripheral according to the first exemplary embodiment has.

DESCRIPTION OF THE EMBODIMENTS

Various exemplary embodiments, features, and aspects of the invention will be described in detail below with reference to the accompanying drawings. Furthermore, the following exemplary embodiments are not intended to limit the invention as claimed in claims, and not all of combinations of characteristics described in the following exemplary embodiments are necessarily essential for resolutions in the invention. Furthermore, in the following exemplary embodiments, a multifunction peripheral (MFP) or a digital MFP is described as an example of an information processing apparatus which utilizes and manages a digital certificate. However, the scope of application of the invention is not limited to multifunction peripherals, but only needs to cover information processing apparatuses capable of utilizing digital certificates.

Figure 1:
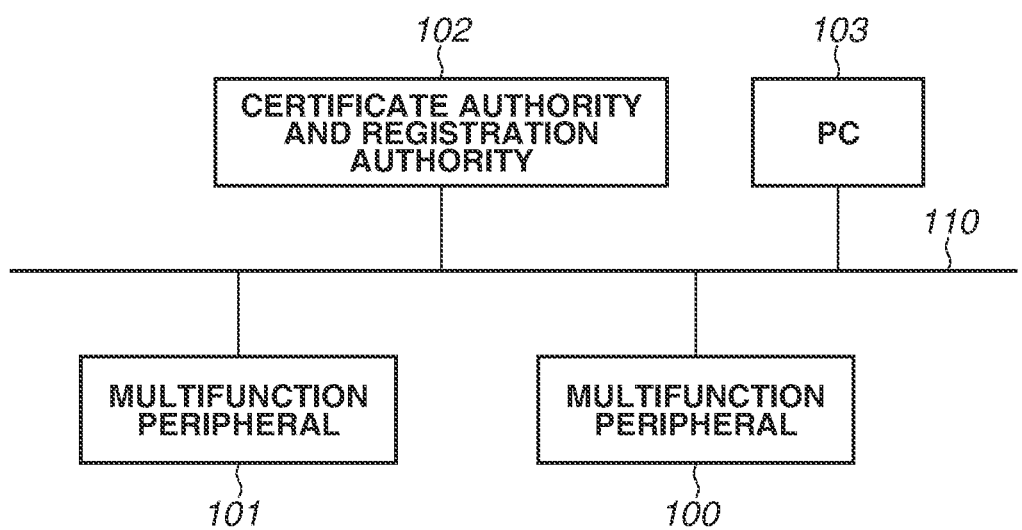
FIG. 1 is a diagram illustrating a network configuration according to a first exemplary embodiment of the present invention.

FIG. 1 is a diagram illustrating a network configuration according to a first exemplary embodiment of the present invention. A multifunction peripheral 100, which has a printing function, is capable of connecting to another information processing apparatus via a network 110. The multifunction peripheral 100 is able to perform transmission and reception of, for example, print data, scanned image data, and management information for devices between another information processing apparatus and the multifunction peripheral 100 via the network 110. Moreover, the multifunction peripheral 100 has the function of performing enciphered communication using, for example, Transport Layer Security (TLS), Internet Protocol Security (IPsec), or IEEE 802.1X, and retains a public key pair and a digital certificate for use in cryptography processing therefor. Here, the multifunction peripheral 100 is an example of an image forming apparatus, and the image forming apparatus is not limited to this but can be an apparatus which has only one of the functions of a facsimile apparatus, a printer, and a copying machine or has a composite function including all or some of those functions. A multifunction peripheral 101 is also connected to the network 110, and the multifunction peripheral 101 has a function equivalent to that of the multifunction peripheral 100. In the following description, the multifunction peripheral 100 is mainly described, but a plurality of multifunction peripherals can be assumed to be targeted for communication of a digital certificate.

A certificate authority and registration authority 102 has the function of a certificate authority (CA), which issues a digital certificate, and the function of a registration authority (RA), which performs reception of an issuance request for a digital certificate and performs registration processing thereof. In other words, the certificate authority and registration authority 102 is a server apparatus which has the function of distributing CA certificates and issuing and registering digital certificates via the network 110. In the first exemplary embodiment, Simple Certificate Enrollment Protocol (SCEP) is assumed to be used as a protocol used for such communications performed via the network 110. An information processing apparatus, such as the multifunction peripheral 100, uses such SCEP to perform communications for an issuance request for a digital certificate and for acquisition of the digital certificate with the certificate authority and registration authority 102 via the network 110. The multifunction peripheral 100 according to the first exemplary embodiment has a web server function, and thus publishes a web page type remote user interface (RUI) function which is capable of performing processing for an issuance request for a digital certificate and for acquisition of the digital certificate on the network 110.

When receiving an issuance request for a digital certificate from another information processing apparatus via the network 110, the certificate authority and registration authority 102 performs issuance processing and registration processing of a digital certificate that is based on the received issuance request, and transmits the issued digital certificate as a response to the received issuance request. Furthermore, while, in the first exemplary embodiment, the functions of a certificate authority and a registration authority are implemented by the same server apparatus, a configuration in which a certificate authority and a registration authority are implemented by the respective different server apparatuses can be employed, and there is no particular limitation. Moreover, while, in the first exemplary embodiment, SCEP is used as the protocol used to perform an issuance request for a digital certificate and to receive the issuance request, any protocol having an equivalent function can be used, and, in the present exemplary embodiment, there is also no particular limitation. For example, Certificate Management Protocol (CMP) or Enrollment over Secure Transport (EST) protocol can also be used.

A personal computer (CP) 103 is equipped with a web browser function and is thus able to be used to view and utilize HyperText Markup Language (HTML) documents or web sites which are published by information processing apparatuses connected to the network 110.

Next, the outline of processing for acquisition and renewal of a digital certificate according to the first exemplary embodiment is described.

The administrator of the multifunction peripheral 100 uses a web browser mounted in the PC 103 to connect to a web page which is published by the multifunction peripheral 100 for an issuance request for a digital certificate and acquisition of the digital certificate, and then performs settings and instructions for executing processing for an issuance request for a digital certificate and acquisition of the digital certificate. The multifunction peripheral 100 transmits an acquisition request for a CA certificate and an issuance request for a digital certificate to the certificate authority and registration authority 102 via SCEP, according to the contents of the settings and instructions performed by the administrator. Moreover, the multifunction peripheral 100 acquires a digital certificate issued by the certificate authority and registration authority 102, which is included in a response to the issuance request for a digital certificate, and performs usage settings of the acquired digital certificate in the multifunction peripheral 100.

Next, a hardware configuration of the multifunction peripheral 100 according to the first exemplary embodiment is described.

Figure 2:
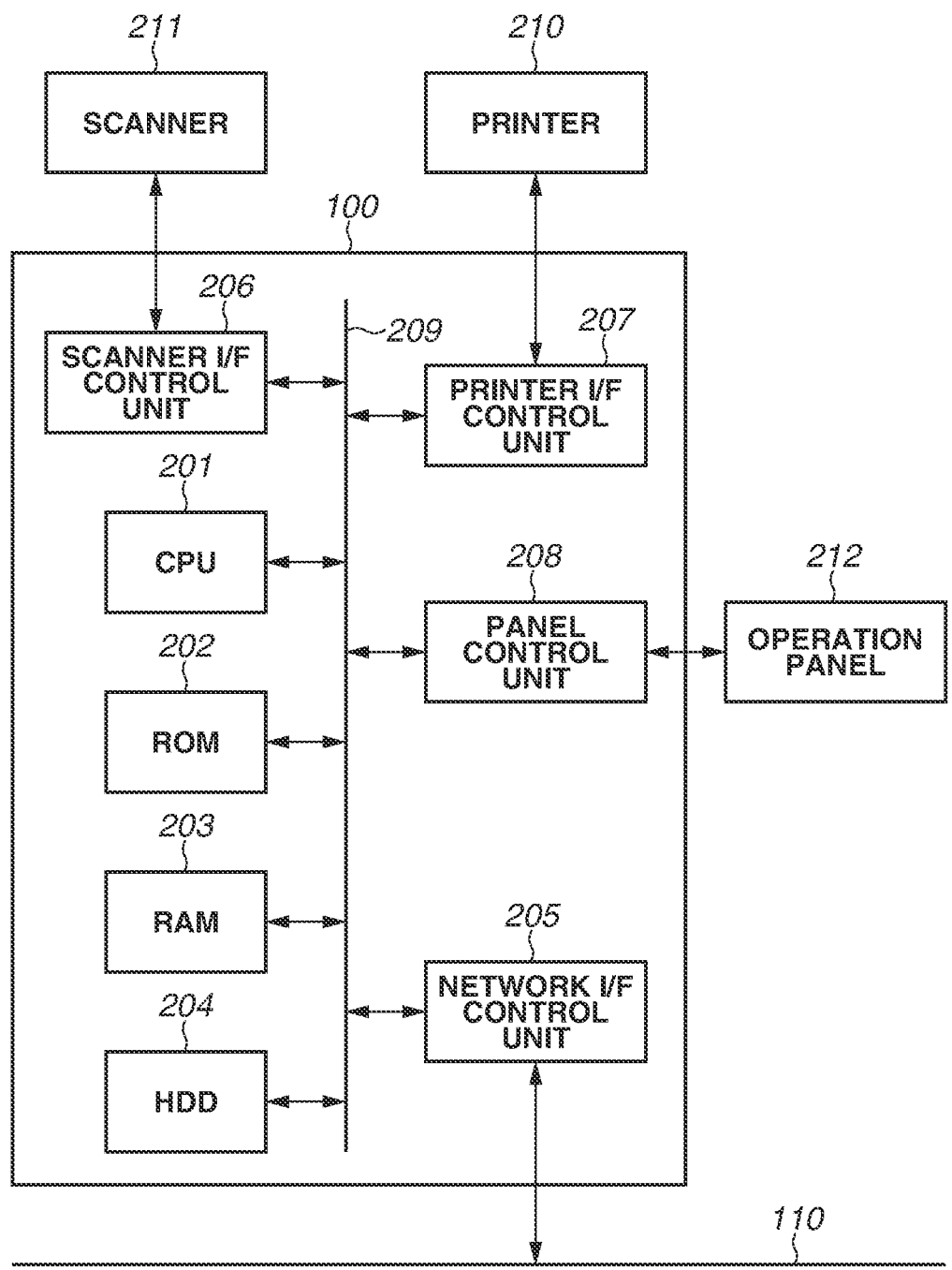
FIG. 2 is a block diagram illustrating a hardware configuration of a multifunction peripheral according to the first exemplary embodiment.

FIG. 2 is a block diagram illustrating a hardware configuration of the multifunction peripheral 100 according to the first exemplary embodiment.

A central processing unit (CPU) 201 executes software programs for the multifunction peripheral 100 and performs control of the entire multifunction peripheral 100. A read-only memory (ROM) 202 stores, for example, a boot program and fixed parameters for the multifunction peripheral 100. A random access memory (RAM) 203 is used to, for example, store programs and temporary data when the CPU 201 controls the multifunction peripheral 100. A hard disk drive (HDD) 204 stores system software, applications, and various pieces of data. The CPU 201 controls operations of the multifunction peripheral 100 by executing the boot program stored in the ROM 202, loading a program stored in the HDD 204 onto the RAM 203, and then executing the loaded program. A network interface (I/F) control unit 205 controls transmission and reception of data with respect to the network 110. A scanner I/F control unit 206 controls reading (scanning) of an original which is performed by a scanner 211. A printer I/F control unit 207 controls, for example, print processing which is performed by a printer 210. A panel control unit 208 controls an operation panel 212 of the touch panel type, thus controlling displaying of various pieces of information and inputting of instructions from the user. A bus 209 is used to interconnect the CPU 201, the ROM 202, the RAM 203, the HDD 204, the network I/F control unit 205, the scanner I/F control unit 206, the printer I/F control unit 207, and the panel control unit 208. Control signals output from the CPU 201 and data signals for use between the respective units are transmitted and received via the bus 209.

Figure 3:
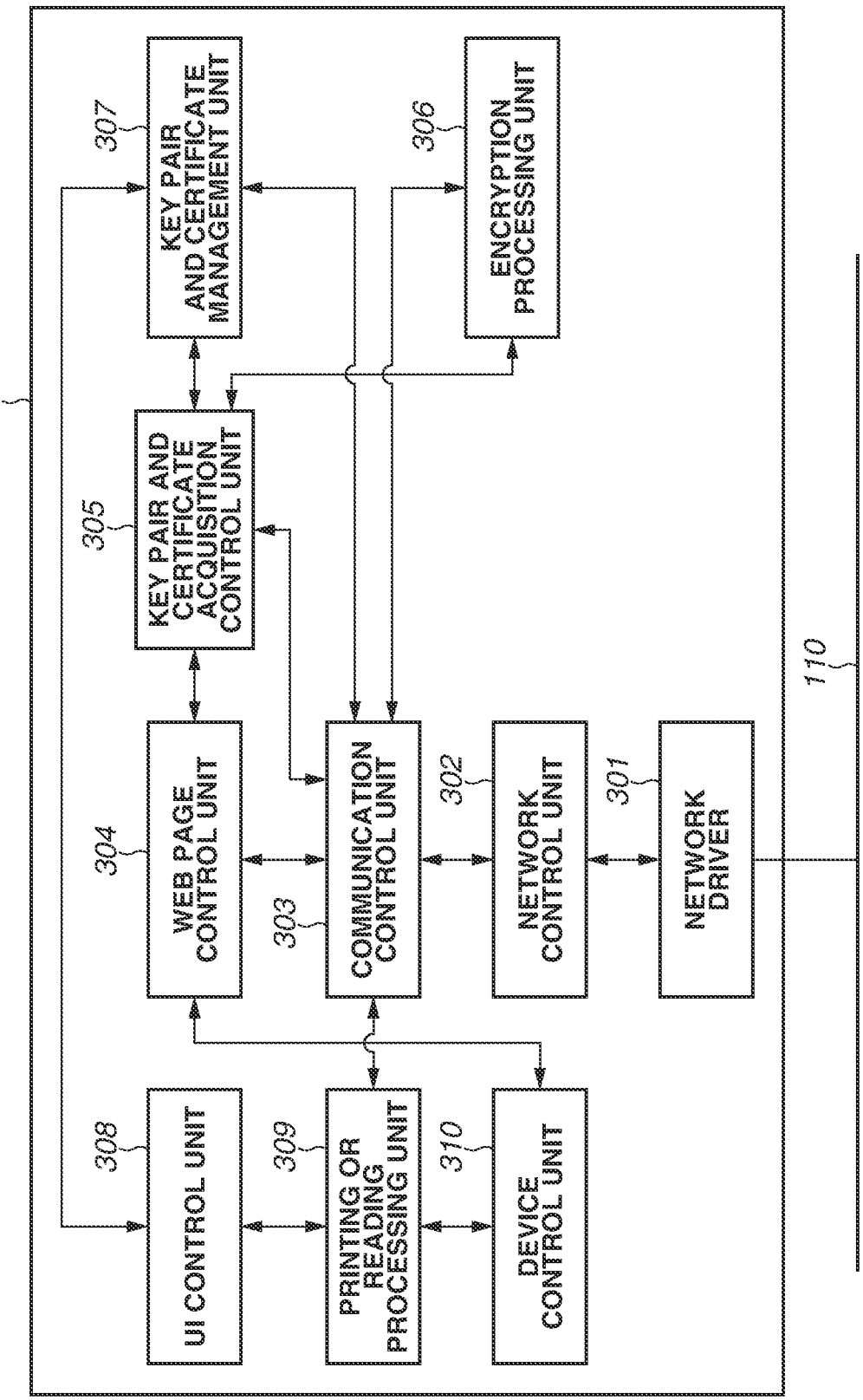
FIG. 3 is a block diagram illustrating software modules included in the multifunction peripheral according to the first exemplary embodiment.

FIG. 3 is a block diagram illustrating software modules included in the multifunction peripheral 100 according to the first exemplary embodiment. Furthermore, the software modules illustrated in FIG. 3 are implemented by the CPU 201 executing programs loaded onto the RAM 203.

A network driver 301 controls the network OF control unit 205, which is connected to the network 110, and performs transmission and reception of data with respect to an external apparatus via the network 110. A network control unit 302 controls communications in the transport layer and layers lower than that in a network communication protocol, such as Transmission Control Protocol/Internet Protocol (TCP/IP), and thus performs transmission and reception of data. A communication control unit 303 is a module which operates to control a plurality of communication protocols which the multifunction peripheral 100 supports. In acquisition processing and renewal processing for a digital certificate according to the first exemplary embodiment, the communication control unit 303 performs control of a request for HTTP protocol communication, generation and analysis processing of response data, and data transmission and reception, and performs communications with the certificate authority and registration authority 102 and the PC 103. Moreover, encrypted communications in TLS, IPsec, and IEEE 802.1X, which the multifunction peripheral 100 supports, are performed by the communication control unit 303.

A web page control unit 304 is a module which performs generation and communication control of HTML data used for displaying a web page which is able to be used to perform processing for an issuance request for a digital certificate and acquisition of the digital certificate. The web page control unit 304 performs processing with respect to a display request for a web page transmitted from the network driver 301 via the communication control unit 303, an issuance request for a digital certificate, and an execution instruction for acquisition of the digital certificate. The web page control unit 304 transmits, as a response to the request from the web browser, HTML data of a predetermined web page stored in the RAM 203 or the HDD 204 or HTML data generated according to the content of the display request.

A key pair and certificate acquisition control unit 305 is a module which operates to perform acquisition processing for a digital certificate which is based on an instruction from the web page control unit 304. Moreover, the key pair and certificate acquisition control unit 305 is also a module which performs, for example, communication control using SCEP, generation and analysis processing of encrypted data required in communication using SCEP, such as Public Key Cryptography Standards (PKCS) #7 or PKCS #10, and processing for storing and use application setting of the acquired digital certificate. An encryption processing unit 306 is a module which operates to perform various encryption processing operations, such as encryption and decryption processing of data, generation and verification of an electronic signature, and generation of hash values. In acquisition and renewal processing for a digital certificate in the first exemplary embodiment, the encryption processing unit 306 performs encryption processing required for generation and analysis processing of request and response data in SCEP. A key pair and certificate management unit 307 is a module which manages public key pairs and digital certificates which the multifunction peripheral 100 retains.

The key pair and certificate management unit 307 stores data about public key pairs and digital certificates together with various setting values in the RAM 203 or the HDD 204. Moreover, processing for, for example, detailed displaying, generation, and deletion of public key pairs and digital certificates is not illustrated in the first exemplary embodiment, but can also be configured to be performed in response to instructions issued by the user via the operation panel 212. Control of the operation panel 212 and the panel control unit 208 is performed by a user interface (UI) control unit 308. Furthermore, even in encryption communication processing using, for example, TLS, IPsec, or IEEE 802.1X, which is performed by the communication control unit 303, encryption processing is performed by the encryption processing unit 306, so that the communication control unit 303 acquires public key pair and digital certificate data, which is to be used, from the key pair and certificate management unit 307.

A printing or reading processing unit 309 is a module which operates to perform the function of, for example, printing by the printer 210 or reading of an original by the scanner 211. A device control unit 310 is a module which generates control commands or control data for the multifunction peripheral 100 and comprehensively controls the multifunction peripheral 100. Furthermore, the device control unit 310 according to the first exemplary embodiment performs control of an electric power supply for the multifunction peripheral 100 and performs reboot processing of the multifunction peripheral 100 in response to an instruction from the web page control unit 304.

Figure 4:
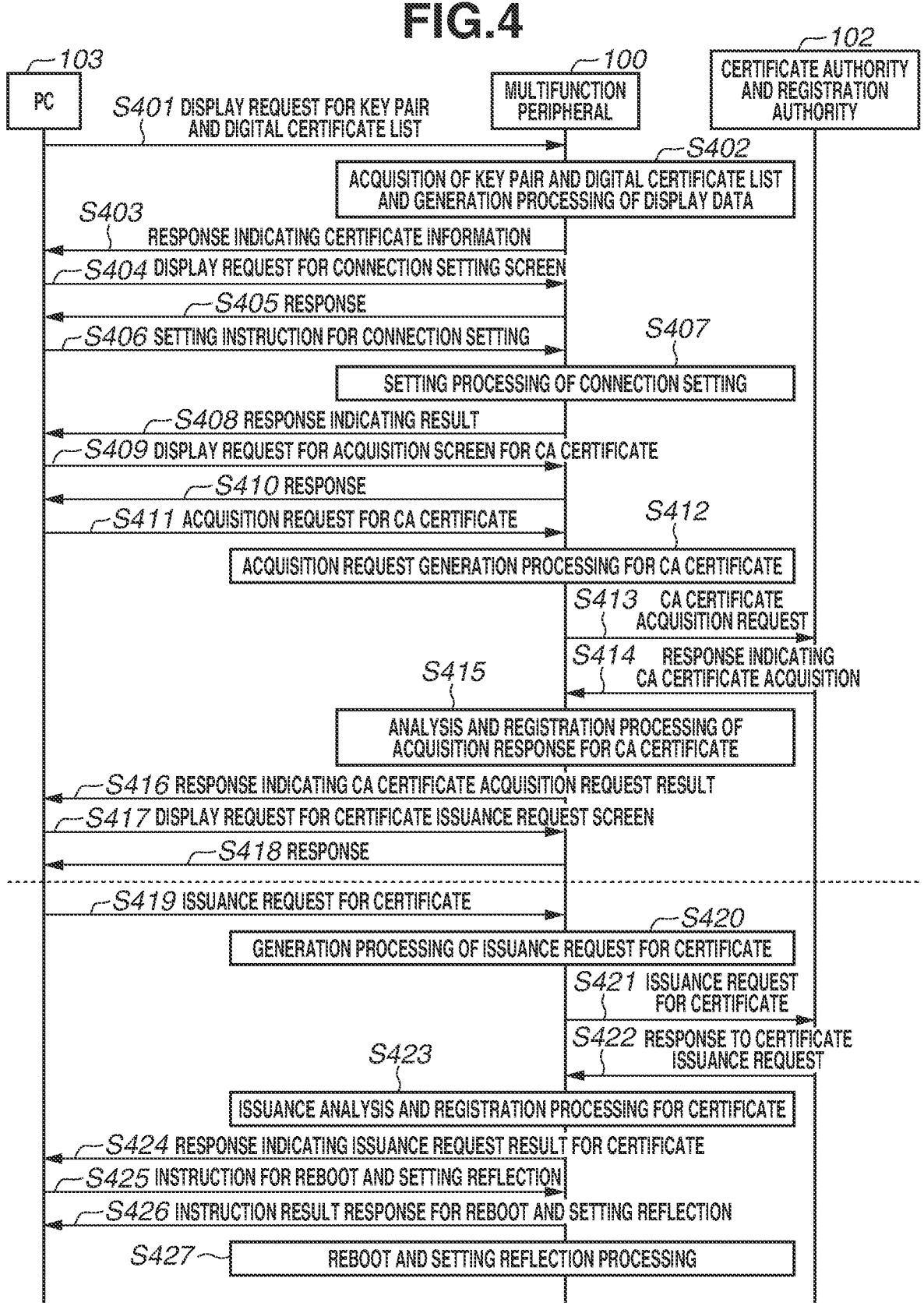
FIG. 4 is a sequence diagram illustrating the flow of overall processing, which includes initial setting concerning an issuance request for a digital certificate, displaying of information about a digital certificate, an issuance request and a reception, reboot, and reflection of the digital certificate, in the system according to the first exemplary embodiment.

FIG. 4 is a sequence diagram illustrating the flow of overall processing, which includes initial setting concerning an issuance request for a digital certificate, displaying of information about a digital certificate, an issuance request and a reception, reboot, and reflection of the digital certificate, in the system according to the first exemplary embodiment.

This sequence is started in response to an instruction for displaying a key pair and digital certificate list being input by the user. While, in the first exemplary embodiment, an example in which processing is performed with respect to one multifunction peripheral 100 is described, processing can be performed with respect to a plurality of multifunction peripherals 100 and 101 in response to a start instruction issued one time. For example, the PC 103 can output requests to the multifunction peripherals 100 and 101, and the respective multifunction peripherals 100 and 101 can perform processing illustrated in flowcharts described below. At this time, a process of acquiring certificates from the multifunction peripherals 100 and 101, displaying the certificates, and requesting confirmation thereof can be skipped. Then, a certificate the expiration date of which has been passed can be automatically detected by a multifunction peripheral, bibliographic information thereof (a certificate identifier (ID) and an expiration date) can be sent to the PC 103, and the PC 103 can cause a plurality of multifunction peripherals to automatically perform renewal of certificates the expiration date of which is about to be passed or has been passed. This operation is what is called "silent install".

First, in step S401, upon receiving connection from the PC 103, the multifunction peripheral 100 receives a display request for a key pair and digital certificate list retained by the multifunction peripheral 100, which is transmitted from the PC 103. In the first exemplary embodiment, the administrator of the multifunction peripheral 100 is assumed to connect to the RUI function of the web page form for an issuance request and acquisition of a digital certificate, which the multifunction peripheral 100 publishes, with use of a web browser mounted in the PC 103, thus performing an operation for, for example, issuing an instruction. The term "RUI", which is an abbreviation for remote user interface, refers to a technique to be able to remotely request operation screen data for the multifunction peripheral 100 or 101 with use of the web browser of the PC 103 and to cause the PC 103 to display such data. At this time, the operation screen data can be implemented with HTML or a servlet.

Next, in step S402, the multifunction peripheral 100 performs acquisition of data for displaying a list of key pairs and digital certificates, which is retained by the multifunction peripheral 100, and generation processing for a web page used to display such data.

FIG. 5A is a flowchart illustrating processing for acquiring a list of key pairs and digital certificates and generating display data, which is performed in step S402 illustrated in FIG. 4. Furthermore, this processing is attained by the CPU 201 executing a program loaded onto the RAM 203.

Moreover, FIGS. 17A, 17B, and 17C are conceptual diagrams illustrating examples of a database of detailed information about key pairs and digital certificates, which the key pair and certificate management unit 307 manages, and this database is stored in the HDD 204 of the multifunction peripheral 100.

The flowchart of FIG. 5A is described. This processing starts in response to reception of an acquisition request for a key pair and digital certificate list. First, in step S501, the CPU 201 receives an acquisition request for a key pair and digital certificate list. Next, the processing proceeds to step S502, in which the CPU 201 acquires, for example, detailed information about key pairs and digital certificates illustrated in FIG. 17A, which the key pair and certificate management unit 307 manages. Next, the processing proceeds to step S503, in which the CPU 201 generates HTML data of a web page screen which is to be provided as the RUI, with use of the detailed information about key pairs and digital certificates acquired in step S502.

FIGS. 10A and 10B to FIG. 15 are diagrams illustrating examples of web page screens of the RUI which are displayed by the PC 103 according to the first exemplary embodiment. In step S503 illustrated in FIG. 5A in the first exemplary embodiment, HTML data of a web page screen illustrated in FIG. 10A is assumed to be generated, and this web page screen is displayed by the web browser of the PC 103. This enables using the PC 103 to confirm a key pair and digital certificate list which is retained by the multifunction peripheral 100.

Information about a digital certificate displayed in the list illustrated in FIG. 10A includes the name 1011 of the certificate, the use application 1012 thereof, the issuer 1013 thereof, the validity period end date 1014 thereof, and the details 1015 thereof. The name 1011 is a character string which the operator, such as the administrator, of the multifunction peripheral 100 optionally assigned at the time of issuance of a key pair and a digital certificate. The use application 1012 is a setting value indicating with which of use applications, i.e., TLS, IPsec, and IEEE 802.1X, the key pair and the digital certificate are used. The issuer 1013 is a Distinguished Name (DN) of a certificate authority which issued the digital certificate. The validity period end date 1014 is information about the day on which the validity period of the digital certificate ends. The details 1015 can be an icon which is operated to display detailed information about the digital certificate. Then, the processing proceeds to step S504, in which the CPU 201 transmits the HTML data generated in step S503 to the PC 103 as a response to the acquisition request received in step S501, and then ends the processing in this flow. In the above-described way, step S403 illustrated in FIG. 4 is performed.

Furthermore, although not illustrated in the sequence diagram of FIG. 4, when the administrator of the multifunction peripheral 100 clicks an icon of the details 1015 illustrated in FIG. 10A, which is displayed on the PC 103, a display request for the detailed information about the corresponding digital certificate is transmitted to the multifunction peripheral 100. The multifunction peripheral 100, having received the display request, acquires the detailed information about the digital certificate, generates HTML data of certificate detailed information that is based on the acquired detailed information, and transmits the generated HTML data to the PC 103 as a response.

This causes the detailed information about the digital certificate, such as that illustrated in FIG. 16, to be displayed by the web browser of the PC 103. FIG. 16 is a diagram illustrating an example of detailed information about a digital certificate, which is displayed on the PC 103.

FIG. 5B is a flowchart illustrating processing which is performed when the multifunction peripheral 100 according to the first exemplary embodiment receives, from the PC 103, a request for displaying such detailed information. Furthermore, this processing is attained by the CPU 201 executing a program loaded onto the RAM 203.

First, in step S511, the CPU 201 receives an acquisition request for detailed information about a digital certificate. Next, the processing proceeds to step S512, in which the CPU 201 acquires detailed information about key pairs and digital certificates illustrated in FIG. 17A, which are managed by the key pair and certificate management unit 307. Next, the processing proceeds to step S513, in which the CPU 201 generates HTML data of a web page screen with use of the detailed information about key pairs and digital certificates acquired in step S512, and, then in step S514, the CPU 201 transmits the generated HTML data to the PC 103.

FIG. 16 is a diagram illustrating an example of a display screen for detailed information about a digital certificate in the first exemplary embodiment, and this screen is displayed by the PC 103 in the form of a web page as the RUI.

Referring back to the description of FIG. 4, in step S403, the multifunction peripheral 100 transmits the HTML data of a web page screen illustrated in FIG. 10A, generated in step S402, to the PC 103 as a response.

Furthermore, the above-described processing operations in steps S401 to S403 illustrated in FIG. 4, steps S501 to S504 illustrated in FIG. 5A, and steps S511 to S514 illustrated in FIG. 5B correspond to control processing concerning display processing for digital certificate information which the multifunction peripheral 100 performs when receiving a display request for a key pair and digital certificate list.

Then, in step S404, the multifunction peripheral 100 receives, from the PC 103, a display request for a connection setting screen of an SCEP server. In the first exemplary embodiment, to perform connection setting with the certificate authority and registration authority 102, the administrator of the multifunction peripheral 100 is assumed to click a "connection setting" key 1002 illustrated in FIG. 10A to transmit a display request for a connection setting screen to the multifunction peripheral 100.

Next, in step S405, the multifunction peripheral 100 transmits, to the PC 103, HTML data of a predetermined connection setting screen of an SCEP server illustrated in FIG. 10B as a response to the display request received in step S404.

The connection setting screen illustrated in FIG. 10B includes input fields for a server name 1016 and a port number 1017, into which to enter the host name and connection destination port number of an SCEP server, and a "setting" button 1018, which is used to issue an instruction to set the input setting values.

Next, in step S406, the multifunction peripheral 100 receives a setting instruction request for connection setting from the PC 103. In the first exemplary embodiment, the administrator of the multifunction peripheral 100 is assumed to perform inputting into the server name 1016 and the port number 1017 illustrated in FIG. 10B via the PC 103 and then click the "setting" button 1018 so as to transmit this setting instruction request to the multifunction peripheral 100.

Next, in step S407, the multifunction peripheral 100 performs setting processing for connection setting and generation processing for a web page screen representing a setting result, and, in step S408, the multifunction peripheral 100 transmits, to the PC 103, HTML data of a web page screen illustrated in FIG. 11A, generated in step S407, as a response.

FIG. 6 is a flowchart illustrating setting processing of connection setting to the certificate authority and registration authority 102 which is performed in step S407 illustrated in FIG. 4 by the multifunction peripheral 100 according to the first exemplary embodiment. Furthermore, this processing is attained by the CPU 201 executing a program loaded onto the RAM 203.

First, in step S601, the CPU 201 receives a setting request for connection setting from the PC 103. Next, the processing proceeds to step S602, in which the CPU 201 receives the setting values of the host name and the port number included in the setting request for connection setting, and stores the acquired setting values in the RAM 203 or the HDD 204. Next, the processing proceeds to step S603, in which the CPU 201 generates, for example, HTML data of a web page screen illustrated in FIG. 11A. Then, the processing proceeds to step S604, in which the CPU 201 transmits the HTML data generated in step S603 as a response to the setting request received in step S601, and then ends the processing in this flow. Thus, the processing shifts to step S408. This causes a character string 1101, which indicates that setting has been reflected, to be displayed on the PC 103, as illustrated in FIG. 11A.

The above-described processing operations in steps S406 to S408 and steps S601 to S604 correspond to control concerning processing for connection setting which is performed by the multifunction peripheral 100.

Next, in step S409 illustrated in FIG. 4, the multifunction peripheral 100 receives a display request for an acquisition screen for a CA certificate, which is transmitted from the browser of the PC 103. In the first exemplary embodiment, to acquire a CA certificate issued by the certificate authority and registration authority 102, the administrator of the multifunction peripheral 100 is assumed to click a "CA certificate acquisition" key 1003 illustrated in FIG. 10A so as to transmit the display request for an acquisition screen for a CA certificate to the multifunction peripheral 100.

With this, in step S410, the multifunction peripheral 100 transmits HTML data of a predetermined acquisition screen for a CA certificate illustrated in FIG. 11B as a response to the display request received in step S409.

The connection setting screen illustrated in FIG. 11B includes an "execution" button 1102, which is used to issue an instruction to acquire a CA certificate.

Next, in step S411, the multifunction peripheral 100 receives an acquisition request for a CA certificate, which is transmitted from the browser of the PC 103 in response to the "execution" button 1102 illustrated in FIG. 11B being clicked. In the first exemplary embodiment, the administrator of the multifunction peripheral 100 is assumed to click the "execution" button 1102 illustrated in FIG. 11B so as to transmit the acquisition request for a CA certificate to the multifunction peripheral 100.

Next, in step S412, the multifunction peripheral 100 performs generation processing for acquisition request data for a CA certificate. Then, the processing proceeds to step S413, in which the multifunction peripheral 100 transmits the acquisition request data for a CA certificate generated in step S412 to the certificate authority and registration authority 102, which is an SCEP server, based on the information set in step S407. Then, the processing proceeds to step S414, in which the multifunction peripheral 100 receives a response to the acquisition request for a CA certificate, which is transmitted from the certificate authority and registration authority 102. Then, the processing proceeds to step S415, in which the multifunction peripheral 100 performs processing for analyzing the received acquisition response for a CA certificate, acquiring a CA certificate included in the response, and registering the acquired CA certificate as a CA certificate which the multifunction peripheral 100 trusts. Then, the processing proceeds to step S416, in which the multifunction peripheral 100 transmits HTML data of a web page screen illustrated in FIG. 12A or FIG. 12B, generated in step S415, to the PC 103. FIG. 12A illustrates an example of a screen which is displayed when the acquisition of a CA certificate is successful and the acquired CA certificate has been registered as a trusted CA certificate. On the other hand, FIG. 12B illustrates an example of a screen which is displayed when the acquisition of a CA certificate is failed.

Figure 7:
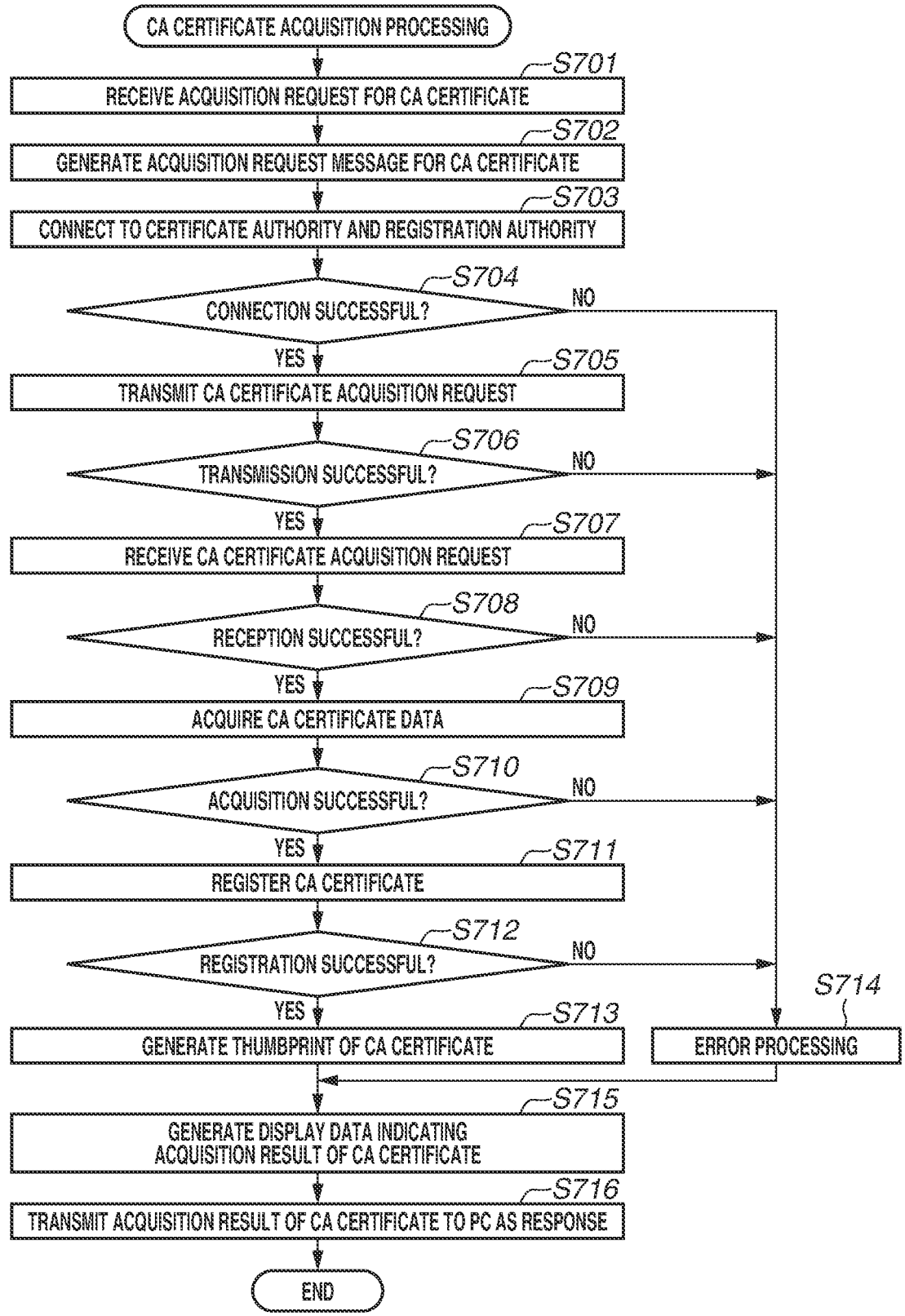
FIG. 7 is a flowchart illustrating certificate-authority (CA) certificate acquisition and registration processing, which is performed in steps S412 to S416 illustrated in FIG. 4 by the multifunction peripheral according to the first exemplary embodiment.

FIG. 7 is a flowchart illustrating CA certificate acquisition and registration processing which is performed in steps S412 to S416 illustrated in FIG. 4 by the multifunction peripheral 100 according to the first exemplary embodiment. Furthermore, this processing is attained by the CPU 201 executing a program loaded onto the RAM 203.

First, in step S701, the CPU 201 receives an acquisition request for a CA certificate from the PC 103. Next, the processing proceeds to step S702, in which the CPU 201 generates a message of the acquisition request for a CA certificate based on information about the connection setting performed with respect to the certificate authority and registration authority 102 acquired in step S407. The following is an example of a message of the acquisition request which is generated in the first exemplary embodiment. In the first exemplary embodiment, since SCEP is used as a communication protocol, the following serves as a request message which is output to use such a protocol.

xxxxxxx/
    yyyyy?operation=GetCAXyz&message=CAIdentifier

Next, the processing proceeds to step S703, in which the CPU 201 performs connection to the certificate authority and registration authority 102, which is an SCEP server, with the TCP/IP protocol based on the connection setting performed with respect to the certificate authority and registration authority 102 acquired in step S407 illustrated in FIG. 4. Next, the processing proceeds to step S704, in which the CPU 201 determines whether the connection performed in step S703 is successful, and, if it is determined that the connection is successful (YES in step S704), the processing proceeds to step S705 and, if it is determined that the connection is failed (NO in step S704), the processing proceeds to step S714.

In step S705, the CPU 201 transmits the acquisition request message for a CA certificate generated in step S702 to the certificate authority and registration authority 102 with the GET or POST method of the HTTP protocol. Next, the processing proceeds to step S706, in which the CPU 201 determines whether the transmission performed in step S705 is successful, and, if it is determined that the transmission is successful (YES in step S706), the processing proceeds to step S707 and, if it is determined that the transmission is failed (NO in step S706), the processing proceeds to step S714. In step S707, the CPU 201 receives response data transmitted from the certificate authority and registration authority 102 with respect to the acquisition request for a CA certificate. Then, the processing proceeds to step S708, in which the CPU 201 determines whether the reception of response data performed in step S707 is successful, and, if it is determined that the reception is successful (YES in step S708), the processing proceeds to step S709 and, if it is determined that the reception is failed (NO in step S708), the processing proceeds to step S714. In step S709, the CPU 201 analyzes the response data received in step S707, and thus acquires a CA certificate included in the received response data. The analysis processing of the response data and the acquisition processing of the CA certificate are performed by the encryption processing unit 306.

Furthermore, the response data in the first exemplary embodiment is assumed to be binary data of the X.509 (RFC 5280) format. However, for example, data of the PKCS #7 (RFC 5652: Cryptographic Message Syntax (CMS)) format can be transmitted as a response, so that there is no particular limitation with respect to a data format.

Next, the processing proceeds to step S710, in which the CPU 201 determines whether the acquisition of a CA certificate performed in step S709 is successful, and, if it is determined that the acquisition is successful (YES in step S710), the processing proceeds to step S711 and, if it is determined that the acquisition is failed (NO in step S710), the processing proceeds to step S714. In step S711, the CPU 201 registers the CA certificate acquired in step S709 as a CA certificate which the multifunction peripheral 100 trusts. At this time, the CPU 201 not only stores the acquired CA certificate in the RAM 203 but also causes the key pair and certificate management unit 307 to store the acquired CA certificate in a predetermined directory of the HDD 204 in which to store CA certificates which the multifunction peripheral 100 trusts. Then, the processing proceeds to step S712, in which the CPU 201 determines whether the registration processing for the CA certificate performed in step S711 is successful, and, if it is determined that the registration processing is successful (YES in step S712), the processing proceeds to step S713 and, if it is determined that the registration processing is failed (NO in step S712), the processing proceeds to step S714. In step S713, the CPU 201 generates a thumbprint (hash values by the SHA-1 algorithm) of the CA certificate, which is displayed with a character string 1201 illustrated in FIG. 12A when the acquisition of a CA certificate is successful. The generation of the thumbprint is performed by the encryption processing unit 306. Then, the processing proceeds to step S715, in which the CPU 201 generates HTML data of display data indicating a result of acquisition of a CA certificate illustrated in FIG. 12A or FIG. 12B, based on a result of processing operations performed in steps S703 to S714. Then, the processing proceeds to step S716, in which the CPU 201 transmits the HTML data generated in step S715 to the PC 103 as a response to the acquisition request received in step S701, and then ends the processing in this flow. Then, the processing shifts to step S417 illustrated in FIG. 4. In the first exemplary embodiment, the CPU 201 displays a character string 1201 illustrated in FIG. 12A according to a result of acquisition of a CA certificate. Moreover, alternatively, when performing error processing in step S714, the CPU 201 displays a character string 1202 illustrated in FIG. 12B. Next, the description refers back to FIG. 4.

In step S417, the multifunction peripheral 100 receives a display request for an issuance request screen for a certificate, which is transmitted from the browser of the PC 103. In the first exemplary embodiment, the administrator of the multifunction peripheral 100 is assumed to click a "certificate issuance request" key 1004 illustrated in FIG. 10A so as to perform an issuance request and acquisition of a certificate with respect to the certificate authority and registration authority 102.

Next, in step S418, the multifunction peripheral 100 transmits HTML data of a predetermined issuance request screen for a certificate illustrated in FIG. 13A to the PC 103 as a response to the display request received in step S417. With this, the PC 103 performs display control to display the screen illustrated in FIG. 13A.

The issuance request screen for a certificate illustrated in FIG. 13A includes the name 1301 of a certificate, the length 1302 of a key for setting the key length of a key pair to be generated, and inputs 1303 of issuance destination information. Moreover, the issuance request screen for a certificate illustrated in FIG. 13A further includes signature verification 1304 for setting whether to verify a signature which is appended to a response to the issuance request for a certificate transmitted from the certificate authority and registration authority 102. The issuance request screen for a certificate illustrated in FIG. 13A further includes a use application 1305 of the key used to perform use application setting of an issued certificate, a password 1306 which is to be included in the certificate issuance request, and an "execution" button 1307 used to perform transmission of an issuance request for a certificate. The use application 1305 is composed of checkboxes, and thus indicates that a plurality of use applications can be set with respect to one key.

Next, in step S419, the multifunction peripheral 100 receives an issuance request for a certificate, including pieces of input and setting information 1301 to 1306, which is transmitted from the browser of the PC 103 in response to the "execution" button 1307 in the screen illustrated in FIG. 13A being clicked. In the first exemplary embodiment, the administrator of the multifunction peripheral 100 performs inputting and setting of pieces of information 1301 to 1306 illustrated in FIG. 13A and clicks the "execution" button 1307 so as to transmit an issuance request for a certificate from the PC 103.

Next, in step S420, the multifunction peripheral 100 performs generation processing for issuance request data for a certificate. Then, in step S421, the multifunction peripheral 100 transmits the issuance request data for a certificate generated in step S420 to the certificate authority and registration authority 102, which is an SCEP server, based on the information set in step S407. Then, in step S422, the multifunction peripheral 100 receives a response to the issuance request data for a certificate, which is transmitted from the certificate authority and registration authority 102.

Next, in step S423, the multifunction peripheral 100 performs processing for analyzing the response to the issuance request data for a certificate received in step S422 (execution of signature verification corresponding to setting, acquisition of a certificate included in the response, and setting of the acquired certificate to the designated use application). Then, the multifunction peripheral 100 performs generation processing for a web page screen indicating a result of the issuance request for a certificate.

Here, in a case where the issuance and acquisition of a certificate are successful, storing and use application setting of digital certificate data are performed by processing in step S423. Here, the use application refers to a communication function using a digital certificate, and, in the first exemplary embodiment, encryption communications, such as TLS, IPsec, and IEEE 802.1X, become able to be set. Moreover, the multifunction peripheral 100 according to the first exemplary embodiment is able to have a plurality of digital certificates and is assumed to perform use application setting for every digital certificate. For example, in a case where a digital certificate which the multifunction peripheral 100 uses to provide a server service for performing TLS communication as a web server is different from a digital certificate which the multifunction peripheral 100 uses to perform client communication using IEEE 802.1X, use applications can be set for the respective digital certificates. However, one digital certificate can be automatically applied to all of the use applications of communication.

Then, in step S424, the multifunction peripheral 100 transmits HTML data of a web page screen illustrated in FIG. 13B or FIG. 14A generated in step S423 to the PC 103. Furthermore, a character string of the setting result, such as a character string 1308 illustrated in FIG. 13B or a character string 1401 illustrated in FIG. 14A, is displayed according to a result of the issuance request for a certificate. FIG. 13B illustrates an example of a screen which is displayed when the issuance and acquisition of a certificate are successful, and FIG. 14A illustrates an example of a screen which is displayed when the issuance and acquisition of a certificate are failed.

In a case where the issuance and acquisition of a certificate are successful in the above-described way, storing and use application setting of digital certificate data are performed by processing in step S423. The communication control unit 303 in the first exemplary embodiment acquires data about a digital certificate which encryption communications of TLS, IPsec, and IEEE 802.1X use, at the time of start-up of the multifunction peripheral 100, and, therefore, in a case where use applications are changed, it becomes necessary to reboot the multifunction peripheral 100.

Figure 8:
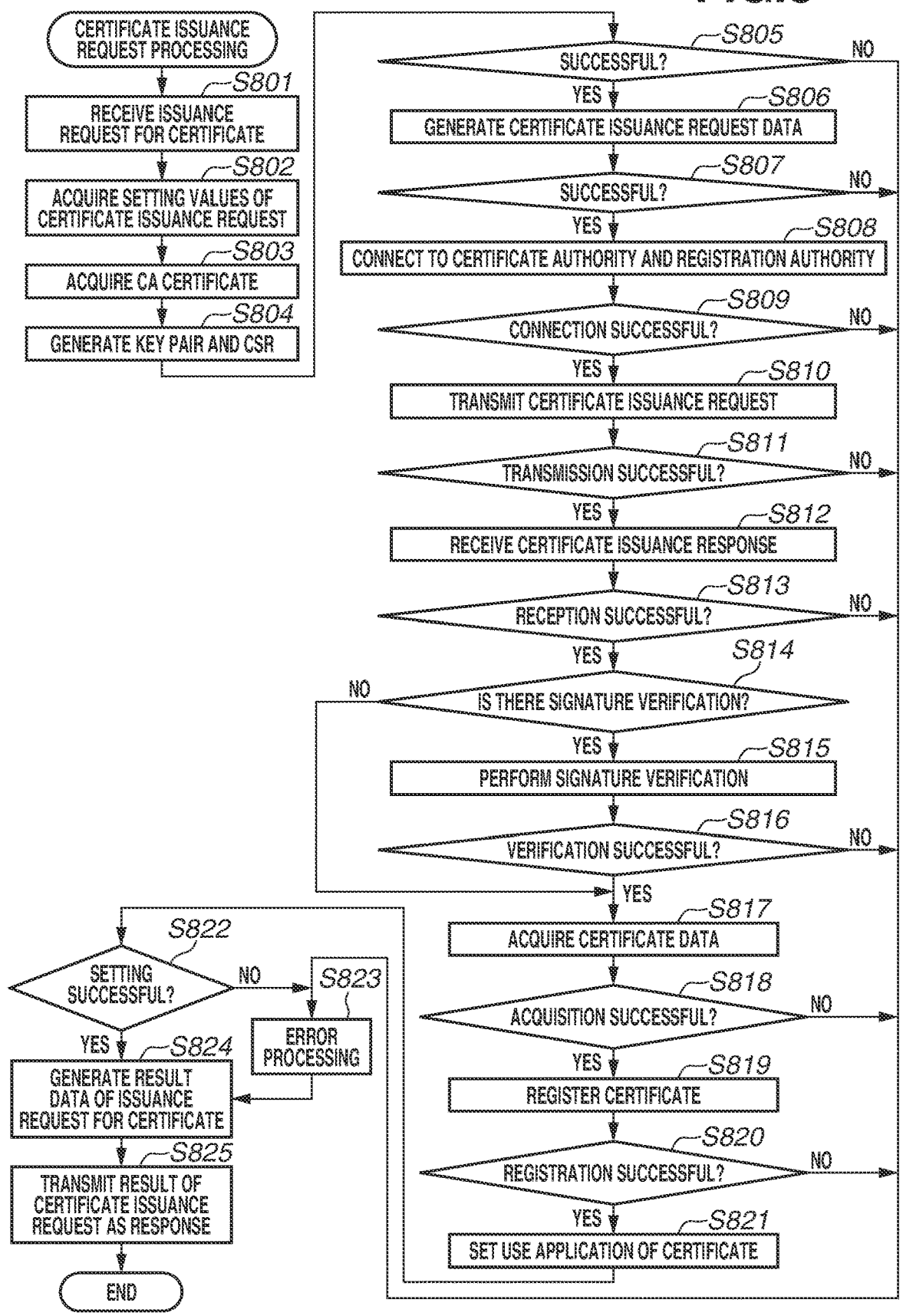
FIG. 8 is a flowchart illustrating certificate issuance request and acquisition processing, which is performed in steps S419 to S424 illustrated in FIG. 4 by the multifunction peripheral according to the first exemplary embodiment.

FIG. 8 is a flowchart illustrating issuance request and acquisition processing for a certificate which is performed in steps S419 to S424 illustrated in FIG. 4 by the multifunction peripheral 100 according to the first exemplary embodiment. Furthermore, this processing is attained by the CPU 201 executing a program loaded onto the RAM 203.

First, in step S801, the CPU 201 receives an issuance request for a certificate from the PC 103. Next, the processing proceeds to step S802, in which the CPU 201 acquires information about the name 1301 of a certificate, the length 1302 of a key, inputs 1303 of issuance destination information, signature verification 1304, and a use application 1305 of the key, which are included in the issuance request for a certificate received in step S801. Next, the processing proceeds to step S803, in which the CPU 201 acquires the CA certificate acquired in steps S412 to S415 illustrated in FIG. 4. Then, the processing proceeds to step S804, in which the CPU 201 performs generation processing for a key pair that is based on information about the name 1301 and the length 1302 of the key acquired in step S802. Moreover, the CPU 201 causes the encryption processing unit 306 to generate certificate signing request (CSR) data of the PKCS #10 (RFC 2986) format that is based on information about inputs 1303 of issuance destination information and a password 1306. Next, the processing proceeds to step S805, in which the CPU 201 determines whether generation of a key pair and a certificate signing request in step S804 is successful, and, if it is determined that generation is successful (YES in step S805), the processing proceeds to step S806 and, if it is determined that generation is failed (NO in step S805), the processing proceeds to step S823. In step S806, the CPU 201 generates issuance request data for a certificate. The issuance request data which is generated in step S806 becomes data of the PKCS #7 format, which is defined in SCEP, based on connection setting to the certificate authority and registration authority 102 acquired in step S407 illustrated in FIG. 4.

Next, the processing proceeds to step S808, in which the CPU 201 performs connection to the certificate authority and registration authority 102, which is an SCEP server, with the TCP/IP protocol based on connection setting to the certificate authority and registration authority 102 acquired in step S407 illustrated in FIG. 4. Next, the processing proceeds to step S809, in which the CPU 201 determines whether connection in step S808 is successful, and, if it is determined that connection is successful (YES in step S809), the processing proceeds to step S810 and, if it is determined that connection is failed (NO in step S809), the processing proceeds to step S823. In step S810, the CPU 201 transmits the issuance request data for a certificate generated in step S806 with the GET or POST method of the HTTP protocol. Then, in step S811, the CPU 201 determines whether transmission in step S810 is successful, and, if it is determined that transmission is successful (YES in step S811), the processing proceeds to step S812 and, if it is determined that transmission is failed (NO in step S811), the processing proceeds to step S823. In step S812, the CPU 201 receives response data to the issuance request for a certificate from the certificate authority and registration authority 102. The response data which is defined by SCEP is a response to be transmitted as data of the PKCS #7 format.

Next, the processing proceeds to step S813, in which the CPU 201 determines whether reception of the response data in step S812 is successful, and, if it is determined that reception is successful (YES in step S813), the processing proceeds to step S814 and, if it is determined that reception is failed (NO in step S813), the processing proceeds to step S823. In step S814, the CPU 201 determines whether there is a setting to perform signature verification, based on the setting in the signature verification 1304 acquired in step S802, and, if it is determined that there is a setting to perform signature verification (YES in step S814), the processing proceeds to step S815 and, if there is a setting not to perform signature verification (NO in step S814), the processing proceeds to step S817. In step S815, the CPU 201 verifies signature data appended to the data received in step S812 with use of a public key included in the CA certificate acquired in step S803. Then, the processing proceeds to step S816, in which the CPU 201 determines whether the result of the signature verification performed in step S815 is successful, and, if it is determined that the result of the signature verification is successful (YES in step S816), the processing proceeds to step S817 and, if it is determined that the result of the signature verification is failed (NO in step S816), the processing proceeds to step S823.

In step S817, the CPU 201 analyzes the response data received in step S812, and acquires data about a certificate included in the analyzed response data. At this time, the CPU 201 causes the encryption processing unit 306 to perform analysis of the response data and acquisition processing for a certificate. Next, the processing proceeds to step S818, in which the CPU 201 determines whether the acquisition of a certificate in step S817 is successful, and, if it is determined that the acquisition is successful (YES in step S818), the processing proceeds to step S819 and, if it is determined that the acquisition is failed (NO in step S818), the processing proceeds to step S823. In step S819, the CPU 201 registers the certificate acquired in step S818 as a digital certificate corresponding to the key pair generated in Step S804. At this time, the CPU 201 causes the key pair and certificate management unit 307 to store the public key pair generated in step S804 and the acquired digital certificate in a predetermined directory of the HDD 204 for storing key pairs and digital certificates. At this time, as illustrated in FIG. 17B, the key pair and certificate management unit 307 adds information about the public key pair generated in step S804 and the acquired digital certificate to the list of detailed information about key pairs and certificates. In FIG. 17B, a key pair and certificate Xyz4 is newly added.

Next, the processing proceeds to step S820, in which the CPU 201 determines whether the registration processing for a digital certificate in step S819 is successful, and, if it is determined that the registration processing is successful (YES in step S820), the processing proceeds to step S821 and, if it is determined that the registration processing is failed (NO in step S820), the processing proceeds to step S823. In step S821, the CPU 201 performs use application setting for a certificate based on information about the use application 1305 of the key acquired in step S802. At this time, as illustrated in FIG. 17C, the key pair and certificate management unit 307 updates information about the use application in the list of detailed information about key pairs and certificates. In FIG. 17C, the key pair and certificate to be used in TLS has been changed from Xyz1 to Xyz4.

Next, the processing proceeds to step S822, in which the CPU 201 determines whether the use application setting in step S821 is successful, and, if it is determined that the use application setting is successful (YES in step S822), the processing proceeds to step S824 and, if it is determined that the use application setting is failed (NO in step S822), the processing proceeds to step S823. In step S823, the CPU 201 performs error processing, and the processing then proceeds to step S824. In step S824, the CPU 201 generates HTML data of an issuance request result for a certificate illustrated in FIG. 13B or FIG. 14A corresponding to a result of processing performed in steps S801 to S823. In step S825, the CPU 201 transmits the HTML data generated in step S824 to the PC 103 as a response to the issuance request for a certificate received in step S801, and then ends the processing in this flow. Then, the processing shifts to step S425 illustrated in FIG. 4.

The above-described processing operations in steps S419 to S424 and steps S801 to S825 correspond to control concerning issuance request and reception processing for a digital certificate and setting of a communication use application, which are performed by the multifunction peripheral 100. In the first exemplary embodiment, processing operations for the issuance request and reception processing and the setting of a communication use application are collectively referred to as an "automatic renewal function for a digital certificate".

This automatic renewal function for a digital certificate enables the multifunction peripheral 100 to automatically perform issuance request and reception processing for a digital certificate via a network and to perform use application setting of the received digital certificate, thus being able to reduce the trouble of a user's operation. The description refers back to FIG. 4.

In step S425, the multifunction peripheral 100 receives a request for rebooting of the multifunction peripheral 100. In the first exemplary embodiment, the administrator of the multifunction peripheral 100 is assumed to click a "reboot" button 1309 illustrated in FIG. 13B so as to reboot the multifunction peripheral 100.

Next, the processing proceeds to step S426, in which the multifunction peripheral 100 transmits HTML data of a predetermined reboot execution screen illustrated in FIG. 14B as a response to the request received in step S425. Next, the processing proceeds to step S427, in which the multifunction peripheral 100 performs reboot processing for the multifunction peripheral 100.

In the multifunction peripheral 100 according to the first exemplary embodiment, it is supposed that, when a use application of communication, such as IEEE 802.1X, is set with respect to the received digital certificate, unless reboot is performed, the set use application is not able to be reflected. This is because, for example, a digital certificate in, for example, IEEE 802.1X is loaded onto the RAM 203 at the time of start-up of the multifunction peripheral 100 and continues being used and, therefore, may not be replaced by the received digital certificate stored in the HDD 204. However, if the multifunction peripheral 100 is capable of switching digital certificates used for a use application of communication without having to be rebooted, reboot can be made unnecessary. For example, in a case where the use application is set to TLS, a configuration in which reboot is made unnecessary can be employed. For example, whether reboot is necessary can be previously set with respect to each of a plurality of use applications, and the multifunction peripheral 100 can automatically determine the necessity or unnecessity of reboot according to such reboot necessity information.

FIG. 9 is a flowchart illustrating processing concerning reboot of the multifunction peripheral 100, which is performed in steps S424 to S427 illustrated in FIG. 4 by the multifunction peripheral 100 according to the first exemplary embodiment. Furthermore, this processing is attained by the CPU 201 executing a program loaded onto the RAM 203.

First, in step S901, the CPU 201 receives a reboot request for the multifunction peripheral 100 from the PC 103. Next, the processing proceeds to step S902, in which the CPU 201 transmits HTML data of a predetermined reboot execution screen for the multifunction peripheral 100 illustrated in FIG. 14B as a response to the reboot request received in step S901. Next, the processing proceeds to step S903, in which the CPU 201 instructs the device control unit 310 to start reboot processing, and then ends the processing in this flow.

The above-described series of processing operations enables the multifunction peripheral 100 after being rebooted to utilize the digital certificate acquired from the certificate authority and registration authority 102.

FIG. 15 illustrates an example of a screen which is displayed in a case where, when the issuance and acquisition of a certificate are successful, displaying of a key pair and digital certificate list is performed again by processing in step S401, and, in the illustrated example, information 1501 about a certificate (Xyz4) issued by the certificate authority and registration authority 102 is added.

Figure 20:
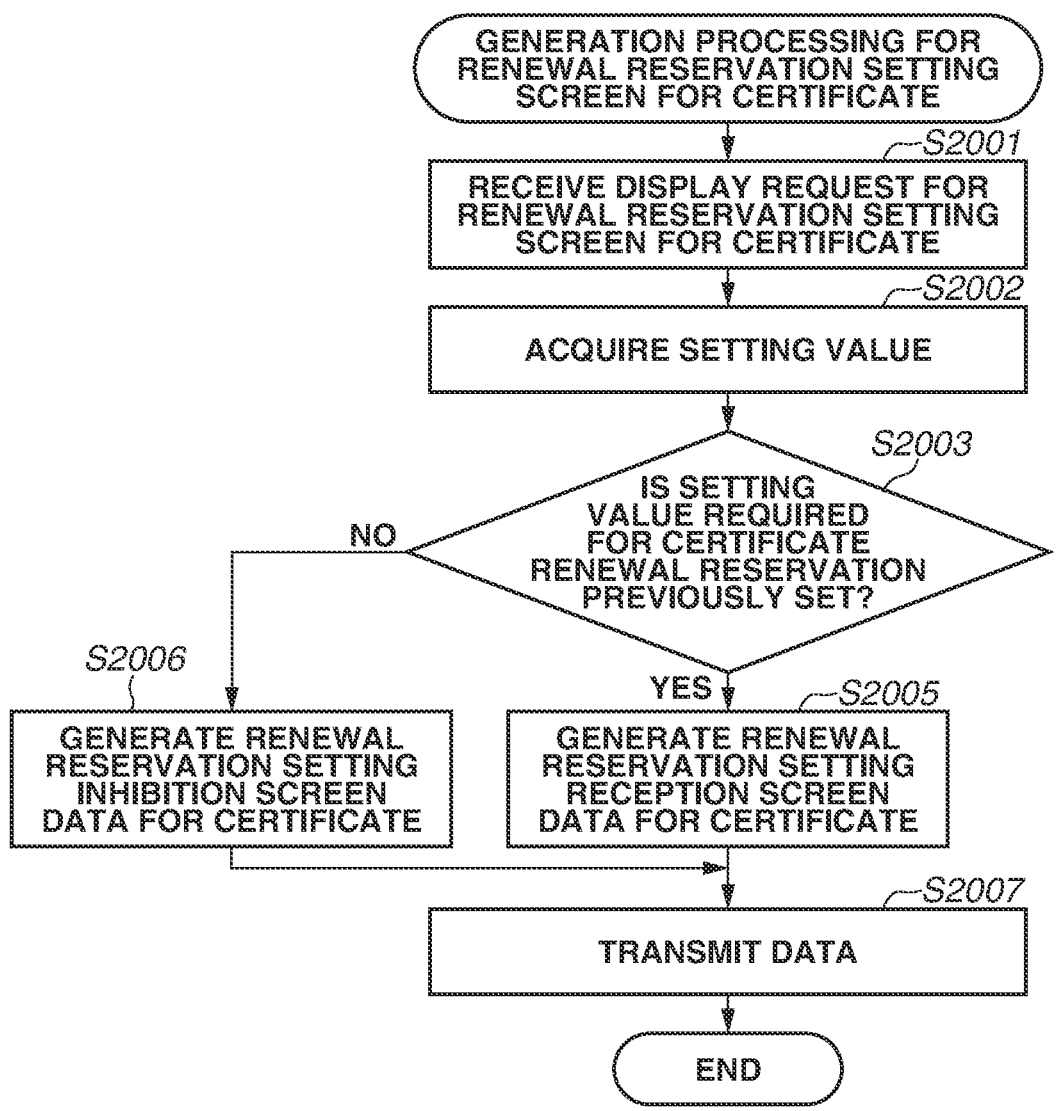
FIG. 20 is a flowchart illustrating generation processing for a renewal reservation setting screen for a digital certificate, which is performed by the multifunction peripheral according to the first exemplary embodiment.

FIG. 20 is a flowchart illustrating generation processing for a renewal reservation setting screen for a certificate illustrated in FIG. 18, which is performed by the multifunction peripheral 100 according to the first exemplary embodiment. Furthermore, this processing is attained by the CPU 201 executing a program loaded onto the RAM 203.

First, in step S2001, the CPU 201 receives a display request for a renewal reservation screen for a certificate from the PC 103.

Next, the processing proceeds to step S2002, in which the CPU 201 acquires a setting value required to perform an automatic renewal function for a digital certificate from the HDD 204.

The "setting value required to perform an automatic renewal function for a digital certificate" in the present exemplary embodiment is a connection setting having information about the server name 1016 and the port number 1017 illustrated in FIG. 10B. However, besides, sometimes there may be another setting value required for the automatic renewal function for a digital certificate, such as a communication timeout time for communication, and there is no particular limitation.

Next, in step S2003, the CPU 201 determines whether the setting value required to perform an automatic renewal function for a digital certificate is previously set.

If, in step S2003, it is determined by the CPU 201 that the setting value acquired in step S2002 is previously set (YES in step S2003), the processing proceeds to step S2005, in which the CPU 201 generates HTML data of a web page screen for receiving renewal reservation setting for a certificate illustrated in FIG. 18. Then, the processing proceeds to step S2007, in which the CPU 201 transmits the HTML data generated in step S2005 to the PC 103 as a response to the display request received in step S2001, and then ends the processing in this flow.

FIG. 18 is a diagram illustrating an example of a renewal reservation setting screen for a certificate, which is stored in the multifunction peripheral 100 according to the first exemplary embodiment and which is displayed by a RUI of the web page type as with the other screens. The renewal date of a certificate is able to be set via the renewal reservation setting screen for a certificate.

In the first exemplary embodiment, as the designation of a renewal date and a renewal interval, three setting values, i.e., a renewal date 1801, a validity period 1802, and a cycle 1803, are available. In the present exemplary embodiment, these setting values are collectively referred to as "certificate renewal reservation setting". The renewal date 1801 is used to designate year, month, day, and time at which to perform renewal, and, when the current date and time retained in the multifunction peripheral 100 has reached the date and time of the renewal date 1801, the multifunction peripheral 100 executes the automatic renewal function for a digital certificate. The validity period 1802 is used to designate the number of days remaining until the expiration date of the certificate which is in use is reached. When the current date and time retained in the multifunction peripheral 100 has reached the date and time of the day on which the number of days remaining until the expiration date has become shorter than the designated number of days, the multifunction peripheral 100 executes the automatic renewal function for a digital certificate. The cycle 1803 is a cycle with which the multifunction peripheral 100 executes the automatic renewal function for a digital certificate. In the first exemplary embodiment, this cycle is able to be set with any one of the number of days, a predetermined day of each month, and a predetermined month and day of each year. Moreover, in the first exemplary embodiment, setting of the renewal date or renewal cycle for a certificate is referred to as "renewal reservation setting for a certificate". When the renewal reservation setting for a certificate is completed, the CPU 201 stores such information in the HDD 204.

FIG. 18 illustrates an example of a screen in which setting is performed with the validity period 1802 such that, when the current date reaches a day 14 days before the expiration date, the multifunction peripheral 100 executes the automatic renewal function for a digital certificate. While, in the first exemplary embodiment, the automatic renewal function for a digital certificate is reserved with respect to types of the above-mentioned renewal reservation setting for a certificate, another designation method for date and time or timing can be employed and there is no particular limitation.

Moreover, the screen illustrated in FIG. 18 further includes certificate automatic deletion setting 1804 as a designation for automatically deleting a certificate which has become unnecessary after renewal. The certificate automatic deletion setting 1804 includes "perform" setting 18041 and "not perform" setting 18042 with respect to automatic deletion. In a case where "perform" setting 18041 is enabled, "delete only when there is no vacant storage area for digital certificate" setting 18043 and "automatic deletion detailed setting" 1805 become able to be set. In a case where "delete only when there is no vacant storage area for digital certificate" setting 18043 is enabled, the multifunction peripheral 100 is configured to delete the certificate if, when a new certificate has been acquired, the storage area for the new certificate reaches an upper limit thereof. In a case where this setting is disabled, the multifunction peripheral 100 deletes the certificate when a condition designated with the "automatic deletion detailed setting" 1805 is satisfied.

The "automatic deletion detailed setting" 1805 includes settings 18051 to 18055.

In a case where "delete preceding certificate with same use application setting" setting 18051 is enabled, a certificate obtained before renewal with the same use application as the use application, such as TLS, designated in the use application 1305 of the key illustrated in FIG. 13A is automatically deleted.

In a case where "delete certificate with no use application setting" setting 18052 is enabled, the multifunction peripheral 100 determines that a certificate which is not yet subjected to use application setting in the certificates retained in the multifunction peripheral 100 is not in use and thus automatically deletes such a certificate.

In a case where "delete only in case of self-signed certificate" setting 18053 is enabled, the multifunction peripheral 100 deletes a self-signed certificate retained in the multifunction peripheral 100 before renewal. The reason why the condition of not deleting certificates other than self-signed certificates is employed is that there may be a usage situation in which, since an externally purchased certificate may be included in the certificates retained in the multifunction peripheral 100, the multifunction peripheral 100 may not be able to determine whether to automatically delete such a certificate.

In a case where "delete factory default certificate" setting 18054 is enabled, the multifunction peripheral 100 deletes a factory default certificate retained in the multifunction peripheral 100 before renewal. The reason why the condition of not deleting certificates other than factory default certificates is employed is that there may be a usage situation in which the multifunction peripheral 100 may not be able to determine whether to automatically delete a certificate later input to the multifunction peripheral 100.

In a case where "delete certificate with expiration date thereof passed" setting 18055 is enabled, if the expiration date of a certificate retained in the multifunction peripheral 100 is passed before renewal, the certificate is not able to be used, and, therefore, the multifunction peripheral 100 automatically deletes such a certificate. Furthermore, the CPU 201 stores these setting values in the HDD 204.

While, in the present exemplary embodiment, the certificate automatic deletion setting is able to be set only via the renewal reservation setting screen illustrated in FIG. 18, the same setting values can also be retained in the issuance request screen for a certificate illustrated in FIG. 13A, and there is no particular limitation.

The description refers back to FIG. 20. If, in step S2003, it is determined by the CPU 201 that the setting value acquired in step S2002 is not previously set (NO in step S2003), the processing proceeds to step S2006, in which the CPU 201 generates HTML data of a web page screen for displaying a message of inhibiting renewal reservation setting for a certificate illustrated in FIG. 21. Then, the processing proceeds to step S2007, in which the CPU 201 transmits the HTML data generated in step S2006 to the PC 103 as a response to the display request received in step S2001, and then ends the processing in this flow.

With the above-described processing operations in steps S2003 to S2007, in a case where the setting value required for execution of the automatic renewal function for a digital certificate is previously set, the multifunction peripheral 100 enables renewal reservation setting for a certificate. In a case where the setting value required for execution of the automatic renewal function for a digital certificate is still not set, the multifunction peripheral 100 does not enable renewal reservation setting for a certificate, and is thus able to prevent failing in transmission of an issuance request for a certificate when certificate acquisition is performed with use of the automatic renewal function for a digital certificate.

Figure 19:
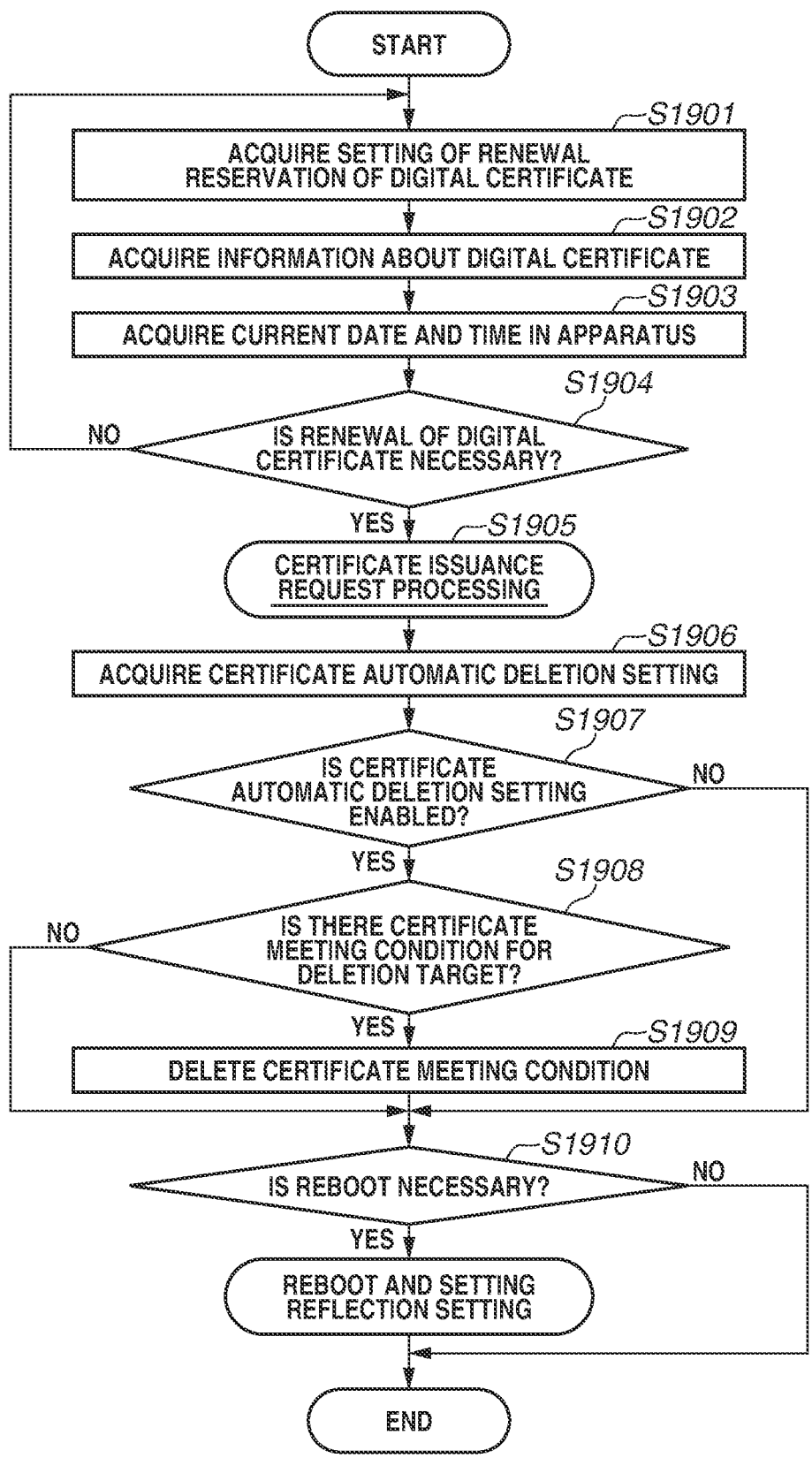
FIG. 19 is a flowchart illustrating processing which is performed when the multifunction peripheral according to the first exemplary embodiment performs an automatic renewal function for a digital certificate and an automatic deletion function therefor based on renewal reservation setting for a digital certificate.

FIG. 19 is a flowchart illustrating processing which is performed when the multifunction peripheral 100 performs the automatic renewal function for a digital certificate based on the renewal reservation setting for a digital certificate. If a plurality of multifunction peripherals is first designated (respective different time settings can be set to a plurality of multifunction peripherals), the plurality of multifunction peripherals can be caused to perform the processing illustrated in FIG. 19. In that case, the processing illustrated in FIG. 19 is performed in parallel by the plurality of multifunction peripherals. Furthermore, this processing is attained by the CPU 201 executing a program loaded onto the RAM 203.

First, in step S1901, the CPU 201 acquires renewal reservation setting for a digital certificate from the HDD 204. Next, the processing proceeds to step S1902, in which the CPU 201 acquires information about a digital certificate which is currently in use. This information is, for example, information retained as illustrated in FIGS. 17A to 17C. Next, the processing proceeds to step S1903, in which the CPU 201 acquires the current date and time, which is managed by the multifunction peripheral 100. Then, the processing proceeds to step S1904, in which the CPU 201 compares the renewal reservation setting for a digital certificate with the information about a digital certificate, and thus determines whether the renewal of the digital certificate which is currently in use is necessary. If it is determined that the renewal of the digital certificate is not necessary (NO in step S1904), the processing returns to step S1901.

On the other hand, if it is determined that the renewal of the digital certificate is necessary (YES in step S1904), the processing proceeds to step S1905, thus shifting to control of "certificate issuance request processing" illustrated in FIG. 8. Then, when the processing illustrated in FIG. 8 is completed, the processing shifts to step S1906.

In step S1906, the CPU 201 acquires certificate automatic deletion setting illustrated in FIG. 18 from the HDD 204.

Next, in step S1907, the CPU 201 determines whether the certificate automatic deletion setting is enabled, and, if it is determined that the certificate automatic deletion setting is not enabled (NO in step S1907), the processing proceeds to step S1910. If, in step S1907, it is determined that the certificate automatic deletion setting is enabled (YES in step S1907), then in step S1908, the CPU 201 determines whether there is a certificate meeting a condition for deletion target. Specifically, the CPU 201 determines whether, with respect to each certificate retained in the multifunction peripheral 100, at least one of the settings 18043 and 18051 to 18055 illustrated in FIG. 18 is enabled. If, in step S1908, it is determined that there is a certificate meeting a condition for deletion target (YES in step S1908), the processing proceeds to step S1909, in which the CPU 201 deletes the certificate meeting the condition in the HDD 204. Then, the processing proceeds to step S1910. If, in step S1908, it is determined that there is no certificate meeting a condition for deletion target (NO in step S1908), the processing proceeds to step S1910.

According to the above-described processing, it is confirmed whether required setting is previously performed when the automatic renewal function for a certificate is enabled, and the automatic renewal function for a certificate is not enabled if required setting is not previously performed, so that the occurrence of a communication error can be prevented. However, if setting is performed in a case where the issuance request for a certificate and the acquisition of a certificate that are based on the automatic renewal function for a certificate become unable to be normally performed, the setting is not limited to communication setting. For example, the setting can be performed with respect to information about, for example, a cryptographic algorithm compatible with a certificate management server or the name of an issuer which is required for issuance of a certificate.

Next, a second exemplary embodiment of the present invention is described.

In the above-described first exemplary embodiment, the web server function included in the multifunction peripheral 100 is used to provide an RUI of the web page type to the user of the multifunction peripheral 100, and the user enables the automatic renewal function for certificates of the multifunction peripheral 100 via the RUI. In this instance, in a case where setting required for the automatic renewal function for certificates is still not performed, the automatic renewal function for certificates is inhibited from being enabled via the RUI, so that a communication error can be prevented from occurring at the time of use of the automatic renewal function for certificates.

Setting of the automatic renewal function for certificates may be performed not only via the RUI, which is employed in the first exemplary embodiment, but also in response to an instruction transmitted via a network or with use of the function of setting value delivery for importing a setting value from a Universal Serial Bus (USB) memory medium. Even in the case of importing setting for enabling the automatic renewal function for certificates with use of the setting value delivery function, it is necessary to prevent the occurrence of an inconsistent operation in the automatic renewal function for certificates by inhibiting enabling the automatic renewal function for certificates in a case where the required setting is still not performed.

In the second exemplary embodiment, in an information processing apparatus having the digital certificate automatic renewal function such as that described in the first exemplary embodiment, control over enabling the automatic renewal function for a digital certificate in a case where a setting value is imported not by the RUI being set by the user but with use of the setting value delivery function is described. Here, the setting value is, for example, the value of any one of the setting items 1801 to 1803 illustrated in FIG. 18, a value indicating copy setting, such as a density adjustment value, used for copying using the multifunction peripheral 100, or a value indicating scan setting used for scanning.

Furthermore, in the second exemplary embodiment, for example, the network configuration, the hardware configuration and software configuration of the multifunction peripheral 100, which is an information processing apparatus, display processing of a list of key pairs and digital certificates, and setting processing of connection setting, which are not repeated in the description of the second exemplary embodiment, are the same as those in the first exemplary embodiment.

Figure 22:
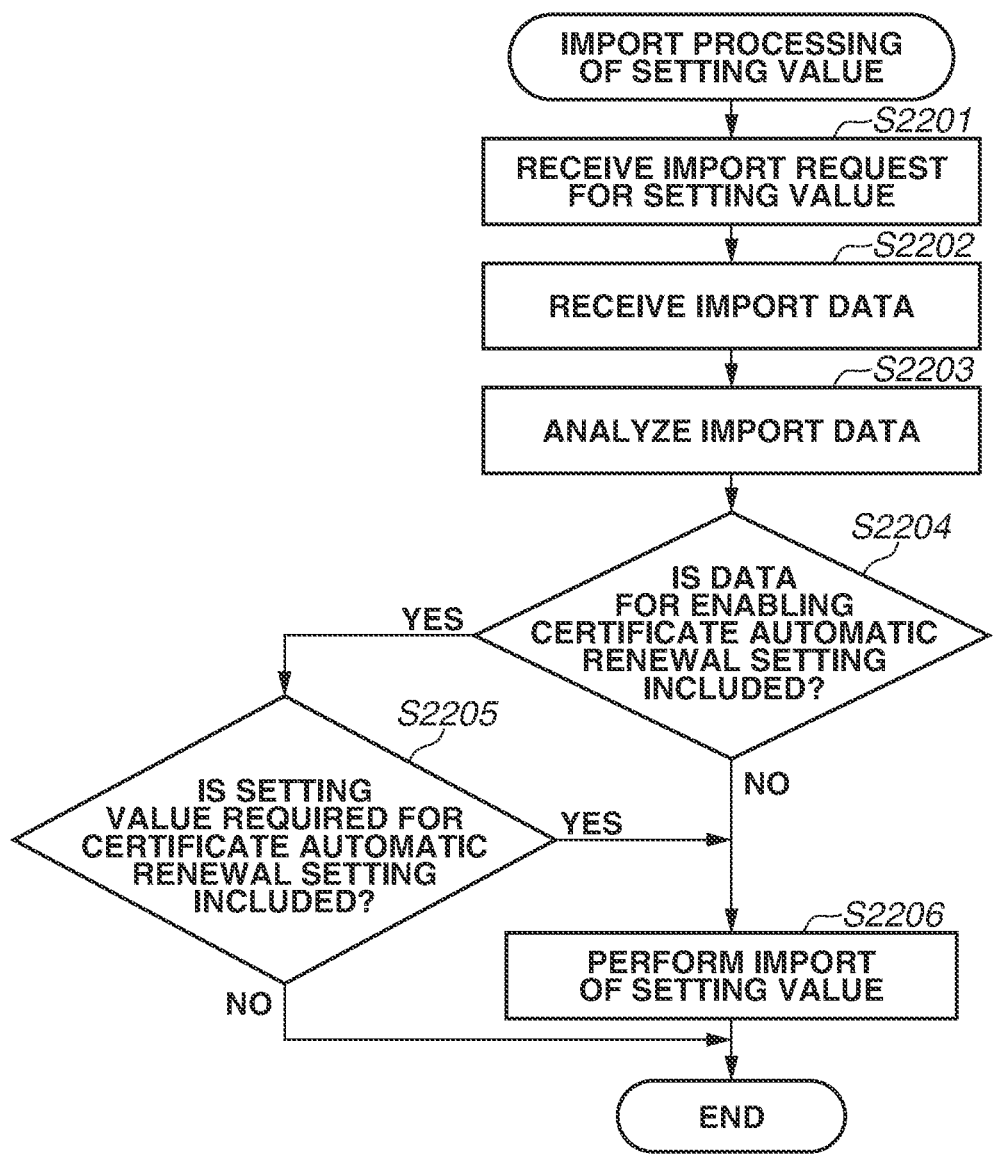
FIG. 22 is a flowchart illustrating processing for importing a setting value required for renewal reservation setting for a digital certificate, which is performed by a multifunction peripheral according to a second exemplary embodiment of the present invention.

FIG. 22 is a flowchart illustrating processing which is performed in a case where the multifunction peripheral 100 according to the second exemplary embodiment imports a setting value with use of the setting value delivery function. Furthermore, this processing is attained by the CPU 201 executing a program loaded onto the RAM 203.

Figure 23:
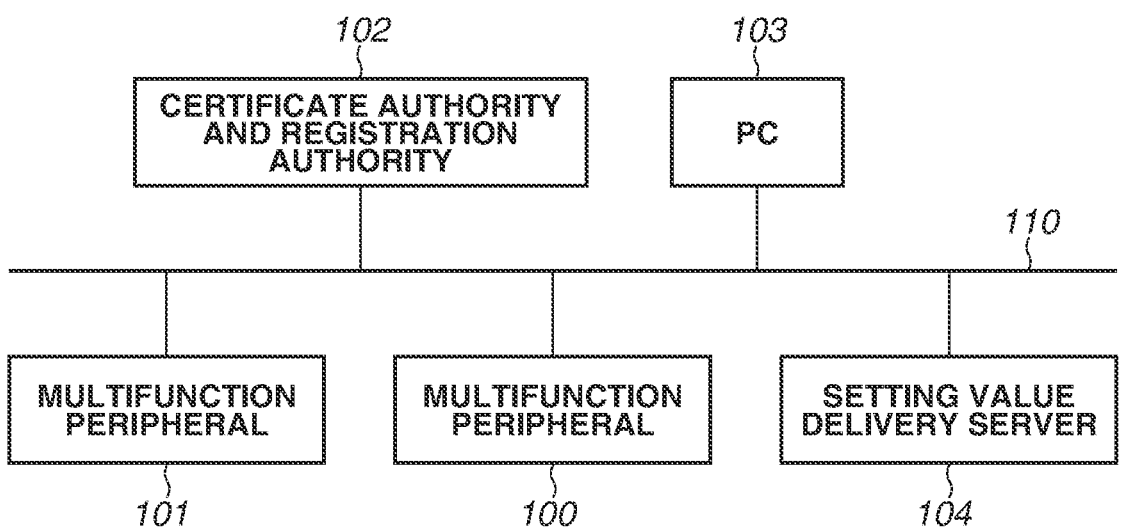
FIG. 23 is a diagram illustrating a network configuration according to the second exemplary embodiment.

The setting value delivery function in the second exemplary embodiment is the function of importing a setting value to the multifunction peripheral 100 from a setting value delivery server via the network 110 or importing a setting value from a USB memory medium connected to the multifunction peripheral 100. While an instruction for import of the setting value can be issued from the setting value delivery server or can be issued via the operation panel 212 of the multifunction peripheral 100, in the flowchart of FIG. 22 in the second exemplary embodiment, an example in which the setting value is imported in response to an instruction transmitted from the setting value delivery server is described. FIG. 23 is a diagram illustrating a network configuration according to the second exemplary embodiment. The multifunction peripheral 100 is connected to a setting value delivery server 104 via the network 110. The other constituent elements are the same as those illustrated in FIG. 1 in the first exemplary embodiment.

The flowchart of FIG. 22 is described.

First, in step S2201, the CPU 201 receives an import request for a setting value from the setting value delivery server 104 via the network 110. Next, the processing proceeds to step S2202, in which the CPU 201 receives import data in which the setting value is included, and stores the received import data in the RAM 203. Next, the processing proceeds to step S2203, in which the CPU 201 analyzes the content of the setting value included in the import data received in step S2202.

Next, the processing proceeds to step S2204, in which the CPU 201 determines whether setting for enabling the automatic renewal function for certificates is included in the setting value included in the received import data. Step S2204 is performed to, for example, check whether any one of the setting items 1801 to 1803 illustrated in FIG. 18 is currently enabled. If, in step S2204, it is determined by the CPU 201 that setting for enabling the automatic renewal function for certificates is not included in the setting value included in the received import data (if none of the setting items 1801 to 1803 illustrated in FIG. 18 is currently enabled) (NO in step S2204), the processing proceeds to step S2206. In step S2206, the CPU 201 stores the setting value included in the received import data in the HDD 204. Then, the CPU 201 ends the processing in this flow.

If, in step S2204, it is determined by the CPU 201 that setting for enabling the automatic renewal function for certificates is included in the setting value included in the received import data (if any one of the setting items 1801 to 1803 illustrated in FIG. 18 is currently enabled) (YES in step S2204), the processing proceeds to step S2205.

In step S2205, the CPU 201 checks whether setting required for the automatic renewal function for certificates is included in the setting value included in the received import data. The setting required for the automatic renewal function for certificates is setting which becomes necessary to perform the automatic renewal function for certificates, such as communication setting (for example, connection setting having information about the server name 1016 and the port number 1017 illustrated in FIG. 10B), as with the first exemplary embodiment.

If, in step S2205, it is determined by the CPU 201 that setting required for the automatic renewal function for certificates is included in the setting value included in the received import data (YES in step S2205), the processing proceeds to step S2206, in which the CPU 201 stores the setting value included in the received import data in the HDD 204. Then, the CPU 201 ends the processing in this flow.

If, in step S2205, it is determined by the CPU 201 that setting required for the automatic renewal function for certificates is not included in the setting value included in the received import data (NO in step S2205), the CPU 201 ends the processing in this flow without performing import of the setting value.

With the above-described processing operations in steps S2203 to S2206, in the case of importing setting for enabling the automatic renewal function for certificates with use of the setting value delivery function, if necessary setting is not concurrently imported, a setting value including the setting for enabling the automatic renewal function is prevented from being imported. This prevents enabling the automatic renewal function for certificates. Accordingly, since the time when the automatic renewal function for certificates is enabled corresponds to only the time when correct setting has been performed with respect to the multifunction peripheral 100, an inconsistent operation such as a communication error can be prevented from occurring at the time of execution of the automatic renewal function for certificates due to correct setting not being performed.

According to exemplary embodiments of the present invention, it is possible to prevent a digital certificate from becoming unable to be acquired from an external apparatus at a previously designated date and time or with a previously designated cycle.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus capable of connecting to an external apparatus via a network, the information processing apparatus comprising:
   one or more controllers including one or more processors and one or more memories, the one or more controllers being configured to:
   set a first setting in which timing to automatically acquire a digital certificate is associated with information for connecting to the external apparatus, and a second setting in which timing to automatically acquire a digital certificate, different from the timing in the first setting, is associated with the information for connecting to the external apparatus; and
   display invalidity of automatically acquiring the digital certificate at the timing associated with the information in a case where the information is not set.

2. The information processing apparatus according to claim 1, further comprising a generation unit configured to generate a public key pair in response to the issuance request for the digital certificate and to generate a signing request for the digital certificate based on the public key pair,
   wherein the issuance request for the digital certificate includes the signing request for the digital certificate.

3. The information processing apparatus according to claim 1, wherein the one or more controllers is further configured to store the acquired digital certificate in the one or more memories.

4. The information processing apparatus according to claim 1, wherein the information for connecting to the external apparatus is a server name of the external apparatus.

5. The information processing apparatus according to claim 1, wherein the information for connecting to the external apparatus is communication setting required for communication with the external apparatus.

6. The information processing apparatus according to claim 1, wherein the information for connecting to the external apparatus is a Uniform Resource Locator (URL) or a port number.

7. The information processing apparatus according to claim 1, wherein the information for connecting to the external apparatus is a communication timeout time.

8. The information processing apparatus according to claim 1, wherein the one or more controllers is further configured to perform control so that a timing for transmitting the issuance request for the digital certificate to the external apparatus is not settable in a case where the information for connecting to the external apparatus is not set.

9. The information processing apparatus according to claim 1, wherein the timing set in the first setting is a date for transmitting the issuance request.

10. The information processing apparatus according to claim 9, wherein the timing set in the second setting is timing based on an expiration date of the digital certificate stored in the information processing apparatus.

11. The information processing apparatus according to claim 10, wherein the one or more controllers is further configured to set a third setting in which timing to automatically acquire a digital certificate, different from the timing in the first setting and the timing in the second setting, is associated with the information for connecting to the external apparatus.

12. The information processing apparatus according to claim 11, wherein the timing set in the third setting is a cycle for transmitting the issuance request.

13. A control method for an information processing apparatus capable of connecting to an external apparatus via a network, the control method comprising:
  setting a first setting in which timing to automatically acquire a digital certificate is associated with information for connecting to the external apparatus, and a second setting in which timing to automatically acquire a digital certificate, different from the timing in the first setting, is associated with the information for connecting to the external apparatus; and
  displaying invalidity of automatically acquiring the digital certificate at the timing associated with the information in a case where the information is not set.

14. The control method according to claim 13, further comprising generating a public key pair in response to the issuance request for the digital certificate and generating a signing request for the digital certificate based on the public key pair,
  wherein the issuance request for the digital certificate includes the signing request for the digital certificate.

15. The control method according to claim 13, further comprising storing the acquired digital certificate in the one or more memories.

16. The control method according to claim 13, wherein the information for connecting to the external apparatus is a server name of the external apparatus.

17. The control method according to claim 13, wherein the information for connecting to the external apparatus is communication setting required for communication with the external apparatus.

18. The control method according to claim 13, wherein the information for connecting to the external apparatus is a Uniform Resource Locator (URL) or a port number.

19. The control method according to claim 13, wherein the information for connecting to the external apparatus is a communication timeout time.

20. The control method according to claim 13, further comprising performing control so that a timing for transmitting the issuance request for the digital certificate to the external apparatus is not settable in a case where the information for connecting to the external apparatus is not set.

21. The control method according to claim 13, wherein the timing set in the first setting is a date for transmitting the issuance request.

22. The control method according to claim 21, wherein the timing set in the second setting is timing based on an expiration date of the digital certificate stored in the information processing apparatus.

23. The control method according to claim 22, further comprising setting a third setting in which timing to automatically acquire a digital certificate, different from the timing in the first setting and the timing in the second setting, is associated with the information for connecting to the external apparatus.

24. The control method according to claim 23, wherein the timing set in the third setting is a cycle for transmitting the issuance request.

25. A non-transitory computer-readable storage medium storing computer-executable instructions that, when executed by a computer, cause the computer to perform a control method for an information processing apparatus capable of connecting to an external apparatus via a network, the control method comprising:
  setting a first setting in which timing to automatically acquire a digital certificate is associated with information for connecting to the external apparatus, and a second setting in which timing to automatically acquire a digital certificate, different from the timing in the first setting, is associated with the information for connecting to the external apparatus; and
  displaying invalidity of automatically acquiring the digital certificate at the timing associated with the information in a case where the information is not set.

* * * * *